United States Patent
Itoh

(10) Patent No.: US 8,706,396 B2
(45) Date of Patent: Apr. 22, 2014

(54) ELECTRONIC APPARATUS AND ELECTRONIC SYSTEM

(75) Inventor: Yuusuke Itoh, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 1504 days.

(21) Appl. No.: 11/646,477

(22) Filed: Dec. 28, 2006

(65) Prior Publication Data

US 2008/0158790 A1    Jul. 3, 2008

(51) Int. Cl.
*G01C 21/00*    (2006.01)

(52) U.S. Cl.
USPC .......................................... 701/400; 296/37.8

(58) Field of Classification Search
USPC .............. 701/200, 400, 36, 49; 307/10.3, 9.1, 307/10.1; 296/37.8, 37.13; 340/426.34; 455/344–346, 348, 350
See application file for complete search history.

(56) References Cited

U.S. PATENT DOCUMENTS

| | | | |
|---|---|---|---|
| 4,178,319 A | 12/1979 | Chattha | |
| 4,542,421 A | 9/1985 | Fujibayashi | |
| 5,493,479 A | 2/1996 | Takahashi | |
| 5,510,957 A | 4/1996 | Takagi | |
| 5,537,673 A | 7/1996 | Nagashima et al. | |
| 5,575,544 A | 11/1996 | Hasegawa et al. | |
| 5,592,389 A | 1/1997 | La Rue et al. | |
| 5,627,547 A | 5/1997 | Ramaswamy et al. | |
| 5,705,975 A | 1/1998 | Serino et al. | |
| 5,733,714 A | 3/1998 | McCulloch et al. | |
| 5,774,828 A | 6/1998 | Brunts et al. | |
| 5,794,164 A | 8/1998 | Beckert et al. | |
| 5,845,282 A | 12/1998 | Alley et al. | |
| 5,862,468 A | 1/1999 | Kim | |
| 5,917,435 A | 6/1999 | Kamiya et al. | |
| 5,941,933 A | 8/1999 | Miyake et al. | |
| 5,964,821 A | 10/1999 | Brunts et al. | |
| 5,999,126 A | 12/1999 | Ito | |
| 6,009,355 A | 12/1999 | Obradovich et al. | |
| 6,023,290 A | 2/2000 | Seita | |
| 6,055,478 A | 4/2000 | Heron | |
| 6,091,956 A | 7/2000 | Hollenberg | |
| 6,093,977 A | 7/2000 | Fujita et al. | |
| 6,119,060 A | 9/2000 | Takayama et al. | |
| 6,125,326 A | 9/2000 | Ohmura et al. | |
| 6,136,507 A | 10/2000 | Morigaki | |
| 6,148,253 A | 11/2000 | Taguchi et al. | |
| 6,150,925 A | 11/2000 | Casazza | |
| 6,163,079 A | 12/2000 | Miyazaki et al. | |

(Continued)

FOREIGN PATENT DOCUMENTS

| | | |
|---|---|---|
| DE | 198 03 178 A1 | 7/1999 |
| EP | 0 507 990 A1 | 10/1992 |

(Continued)

OTHER PUBLICATIONS

U.S. Appl. No. 11/645,629, filed Dec. 27, 2006.

(Continued)

*Primary Examiner* — Dalena Tran
(74) *Attorney, Agent, or Firm* — Oliff PLC

(57) ABSTRACT

An electronic apparatus detachably holding a portable apparatus, the electronic apparatus includes: a housing portion to which the portable apparatus is attached; an eject mechanism ejecting the portable apparatus attached to the housing portion; and a support mechanism detachably supporting the portable apparatus in an ejected state where the portable apparatus is ejected from the housing portion.

10 Claims, 17 Drawing Sheets

(56) References Cited

U.S. PATENT DOCUMENTS

| | | |
|---|---|---|
| 6,202,008 B1 | 3/2001 | Beckert et al. |
| 6,208,932 B1 | 3/2001 | Ohmura et al. |
| 6,243,645 B1 | 6/2001 | Moteki et al. |
| 6,303,266 B1 | 10/2001 | Okino et al. |
| 6,405,049 B2 | 6/2002 | Herrod et al. |
| 6,417,786 B2 | 7/2002 | Learman et al. |
| 6,421,606 B1 | 7/2002 | Asai et al. |
| 6,653,049 B2 | 11/2003 | Pavelchek et al. |
| 6,681,176 B2 | 1/2004 | Funk et al. |
| 6,701,161 B1 | 3/2004 | Wendling |
| 6,791,844 B2 | 9/2004 | Tobishima et al. |
| 6,803,168 B1 | 10/2004 | Padmanaban et al. |
| 6,816,783 B2 | 11/2004 | Hashima et al. |
| 6,993,615 B2 | 1/2006 | Falcon |
| 7,006,845 B2 | 2/2006 | Simon |
| 7,016,986 B2 | 3/2006 | Fasolt |
| 7,062,378 B2 | 6/2006 | Krull et al. |
| 7,079,863 B2 | 7/2006 | Chikaishi |
| 7,117,286 B2 | 10/2006 | Falcon |
| 7,184,003 B2 | 2/2007 | Cupps et al. |
| 7,215,950 B2 | 5/2007 | Mazzara, Jr. et al. |
| 7,216,242 B2 | 5/2007 | Glass et al. |
| 7,222,207 B2 | 5/2007 | Falcon |
| 7,650,230 B1 * | 1/2010 | Laverick et al. .............. 701/200 |
| 2002/0004704 A1 * | 1/2002 | Nagatsuma et al. .......... 701/213 |
| 2002/0024597 A1 | 2/2002 | Arai et al. |
| 2002/0068549 A1 | 6/2002 | Tendler |
| 2002/0137541 A1 | 9/2002 | Lepley et al. |
| 2002/0152027 A1 | 10/2002 | Allen |
| 2003/0022624 A1 | 1/2003 | Sato |
| 2003/0103634 A1 | 6/2003 | Ito |
| 2003/0215736 A1 | 11/2003 | Oberlander et al. |
| 2004/0058656 A1 | 3/2004 | Chikaishi |
| 2004/0204159 A1 | 10/2004 | Van Bosch |
| 2004/0247280 A1 | 12/2004 | Izawa |
| 2005/0139731 A1 | 6/2005 | Park et al. |
| 2006/0031617 A1 | 2/2006 | Falcon |
| 2006/0211256 A1 | 9/2006 | Takei et al. |
| 2008/0130206 A1 | 6/2008 | Itoh |
| 2008/0161047 A1 | 7/2008 | Witkowski et al. |

FOREIGN PATENT DOCUMENTS

| | | |
|---|---|---|
| EP | 0 658 011 A | 6/1995 |
| EP | 1 251 034 A2 | 10/2002 |
| EP | 1 727 019 A1 | 11/2006 |
| GB | 2 287 501 A | 9/1995 |
| GB | 2 336 489 A | 10/1999 |
| JP | U-57-204770 | 6/1956 |
| JP | Y-63-018184 | 5/1988 |
| JP | A 04-238218 | 8/1992 |
| JP | U-05-044702 | 6/1993 |
| JP | A-06-176652 | 6/1994 |
| JP | A-06-252565 | 9/1994 |
| JP | A-07-029361 | 1/1995 |
| JP | A 07-074479 | 3/1995 |
| JP | A-07-132779 | 5/1995 |
| JP | A-07-156719 | 6/1995 |
| JP | A 08-007977 | 1/1996 |
| JP | A 08-260794 | 10/1996 |
| JP | 08-318792 | 12/1996 |
| JP | A 08-318792 | 12/1996 |
| JP | A 10-16654 | 1/1998 |
| JP | A-10-021678 | 1/1998 |
| JP | A 10-103999 | 4/1998 |
| JP | A 10-135669 | 5/1998 |
| JP | A 10-199220 | 7/1998 |
| JP | A 11-289173 | 10/1999 |
| JP | 2000-311029 A | 11/2000 |
| JP | A 2001-015936 | 1/2001 |
| JP | A-2001-052473 | 2/2001 |
| JP | 2001-141471 A | 5/2001 |
| JP | A 2001-239895 | 9/2001 |
| JP | A-10-2001-0112146 | 12/2001 |
| JP | A-2002-74922 | 3/2002 |
| JP | A-2002-181555 | 6/2002 |
| JP | A-2002-267461 | 9/2002 |
| JP | A 2002-328026 | 11/2002 |
| JP | A 2003-003554 | 1/2003 |
| JP | 2003-035554 A | 2/2003 |
| JP | 2003-037514 A | 2/2003 |
| JP | A 2003-166848 | 6/2003 |
| JP | A 2003-521825 | 7/2003 |
| JP | A-2003-308686 | 10/2003 |
| JP | 2003-315065 A | 11/2003 |
| JP | A 2004-234794 | 8/2004 |
| JP | 2005-173653 A | 6/2005 |
| JP | A 2005-524570 | 8/2005 |
| KR | 10-2003-0071743 A | 9/2003 |
| KR | 10-2004-0061642 A | 7/2004 |
| KR | 10-2005-0017296 A | 2/2005 |
| KR | 10-2006-0030344 A | 4/2006 |
| KR | 2006-128470 A | 12/2006 |
| WO | WO 98/39852 | 9/1998 |
| WO | WO 99/38728 | 8/1999 |
| WO | WO-2004/092840 A1 | 10/2004 |
| WO | WO 2006/130784 A2 | 12/2006 |

OTHER PUBLICATIONS

U.S. Appl. No. 11/645,642, filed Dec. 27, 2006.
U.S. Appl. No. 11/645,628, filed Dec. 27, 2006.
U.S. Appl. No. 11/646,539, filed Dec. 28, 2006.
U.S. Appl. No. 11/646,566, filed Dec. 28, 2006.
U.S. Appl. No. 11,645,672, filed Dec. 27, 2006.
U.S. Appl. No. 11/646,557, filed Dec. 28, 2006.
U.S. Appl. No. 11/646,478, filed Dec. 28, 2006.
U.S. Appl. No. 11/646,558, filed Dec. 28, 2006.
U.S. Appl. No. 11/646,498, filed Dec. 28, 2006.
U.S. Appl. No. 11/646,538, filed Dec. 28, 2006.
U.S. Appl. No. 11/646,479, filed Dec. 28, 2006.
M. Mukasa. "Detachable-Panel Connectors Respond to Needs for Anti-Theft Designs," JEE Journal of Electronic Engineering 30, Feb. 1993, No. 314, Tokyo, Japan.
European Office Action issued Jan. 5, 2012 in European Application No. 07 122 196.4.
Jul. 3, 2012 Office Action issued in Japanese Patent Application No. 2007-330875 (with partial translation).
Jul. 3, 2012 Office Action issued in Japanese Patent Application No. 2007-330873 (with partial translation).
Jul. 3, 2012 Office Action issued in Japanese Patent Application No. 2007-330874(with partial translation).

* cited by examiner

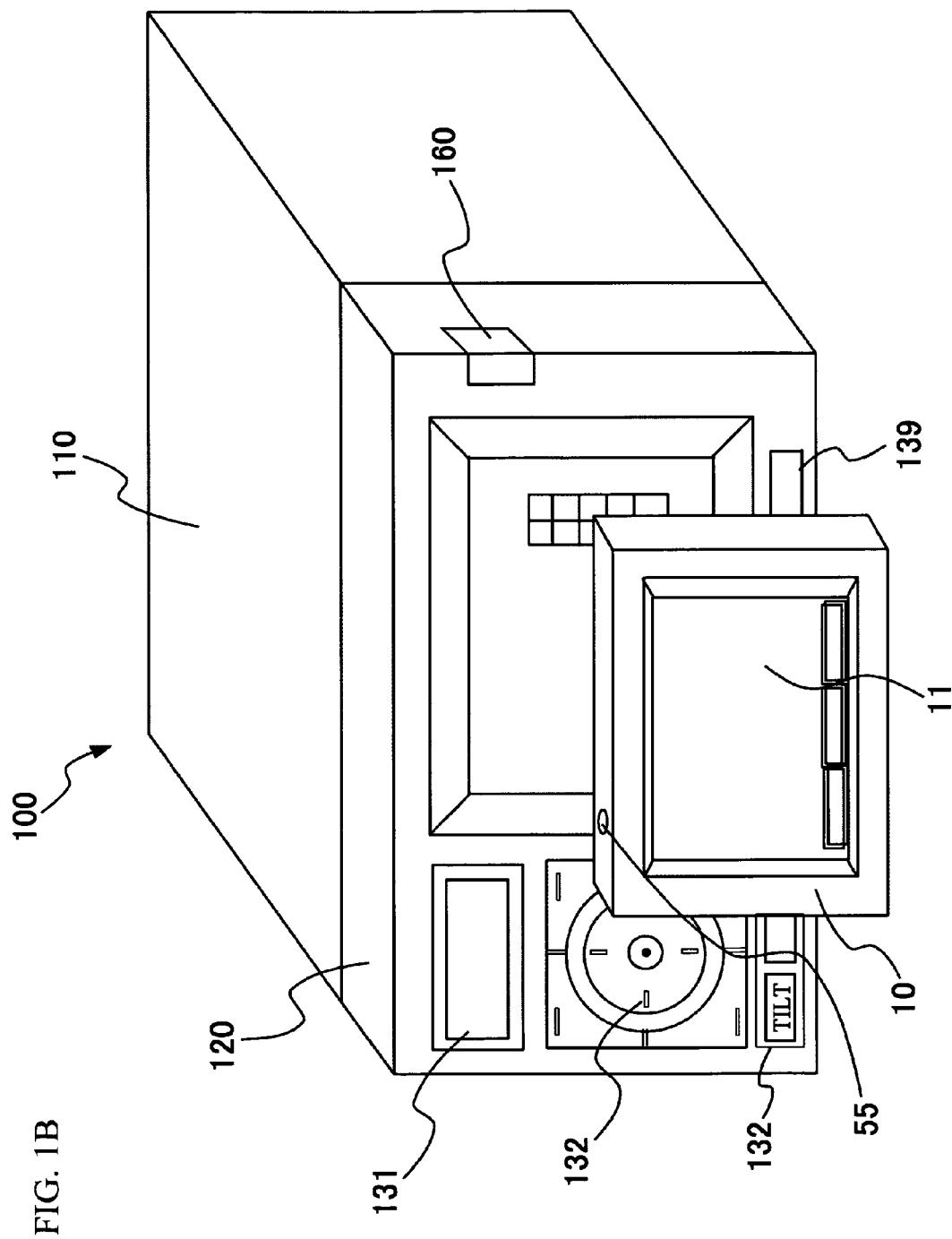

ELECTRONIC APPARATUS AND ELECTRONIC SYSTEM

BACKGROUND OF THE INVENTION

1. Field of the Invention

This invention relates to an electronic apparatus and electronic system.

2. Description of the Related Art

As conventional navigation apparatuses, there are widely known small-sized portable navigation apparatuses with simplified structure and portability (hereinafter, referred to as Portable Navi), also known as personal navigation device; and in-vehicle navigation apparatuses accommodated and fixed in a recess portion (DIN opening) formed in a dashboard of a vehicle. The in-vehicle navigation apparatuses are capable of guiding with high accuracy by use of the information supplied from vehicles such as vehicle speed, and some of the in-vehicle navigation apparatuses are equipped with audio devices.

In recent years, the navigation apparatuses with portability of the Portable Navi and high-accuracy guide function of the in-vehicle navigation apparatus have been studied.

Japanese Patent Application Publication No. 8-318792, Japanese Patent Application Publication No. 2002-328026, Japanese Patent Application Publication No. 2005-524570, and Japanese Patent Application Publication No. 2001-239895 disclose a configuration where a navigation portion can be detached from an in-vehicle apparatus mounted in a vehicle. By removing the navigation portion from the in-vehicle apparatus, the navigation portion can be used as a Portable Navi of a single unit.

Also, as disclosed in Japanese Patent Application Publication No. 2003-166848, the navigation apparatus is taken out of the vehicle and can be used while walking. In addition, when mounted in a vehicle, the navigation apparatus is in a car-navigation mode, and when taken out of the vehicle, the navigation apparatus is in a person-navigation mode.

The in-vehicle apparatus that detachably retains the navigation apparatus is provided with: a housing portion for housing the navigation apparatus; and an eject mechanism ejecting the navigation apparatus attached to the housing portion.

However, when the navigation apparatus is ejected from the housing portion, there is the possibility that the navigation apparatus drops out of the in-vehicle apparatus and the navigation portion may be broken.

SUMMARY OF THE INVENTION

The present invention has been made in view of the above circumstances and provides an electronic apparatus and an electronic system having the same, by which when a portable apparatus attached to the electronic apparatus is detached, the drop of the portable apparatus can be prevented.

According to one aspect of the present invention, there is provided an electronic apparatus detachably holding a portable apparatus, the electronic apparatus including: a housing portion to which the portable apparatus is attached; an eject mechanism ejecting the portable apparatus attached to the housing portion; and a support mechanism detachably supporting the portable apparatus in an ejected state where the portable apparatus is ejected from the housing portion.

With this configuration, at the time of the operation of the eject mechanism; it is possible to prevent the drop of the portable apparatus from the electronic apparatus. Also, the support mechanism detachably supports the portable apparatus in the state where the portable apparatus is ejected from the housing portion, thereby facilitating the removal of the portable apparatus from the electronic apparatus.

According to another aspect of the present invention, there is provided an electronic system provided with an electronic apparatus having a housing portion in which a portable apparatus and the electronic apparatus are detachably held, the electronic apparatus including: a housing portion to which the portable apparatus is attached; an eject mechanism ejecting the portable apparatus attached to the housing portion; and a support mechanism detachably supporting the portable apparatus in an ejected state where the portable apparatus is ejected from the housing portion.

Also, with this configuration, at the time of the operation of the eject mechanism; it is possible to prevent the drop of the portable apparatus from the electronic apparatus. Also, the support mechanism detachably supports the portable apparatus in the state where the portable apparatus is ejected from the housing portion, thereby facilitating the removal of the portable apparatus from the electronic apparatus.

BRIEF DESCRIPTION OF THE DRAWINGS

Exemplary embodiments of the present invention will be described in detail with reference to the following drawings, wherein:

FIG. 1A and FIG. 1B are schematic views of an in-vehicle system;

DESCRIPTION OF THE PREFERRED EMBODIMENTS

A description will now be given, with reference to the accompanying drawings, of exemplary embodiments of the present invention.

An exemplary embodiment of the present invention will be described with reference to the drawings. However, the technical scope of the present invention is not limited to the exemplary embodiments described below but instead, includes all equivalents to the terms of the claim described.

Figure 1A:
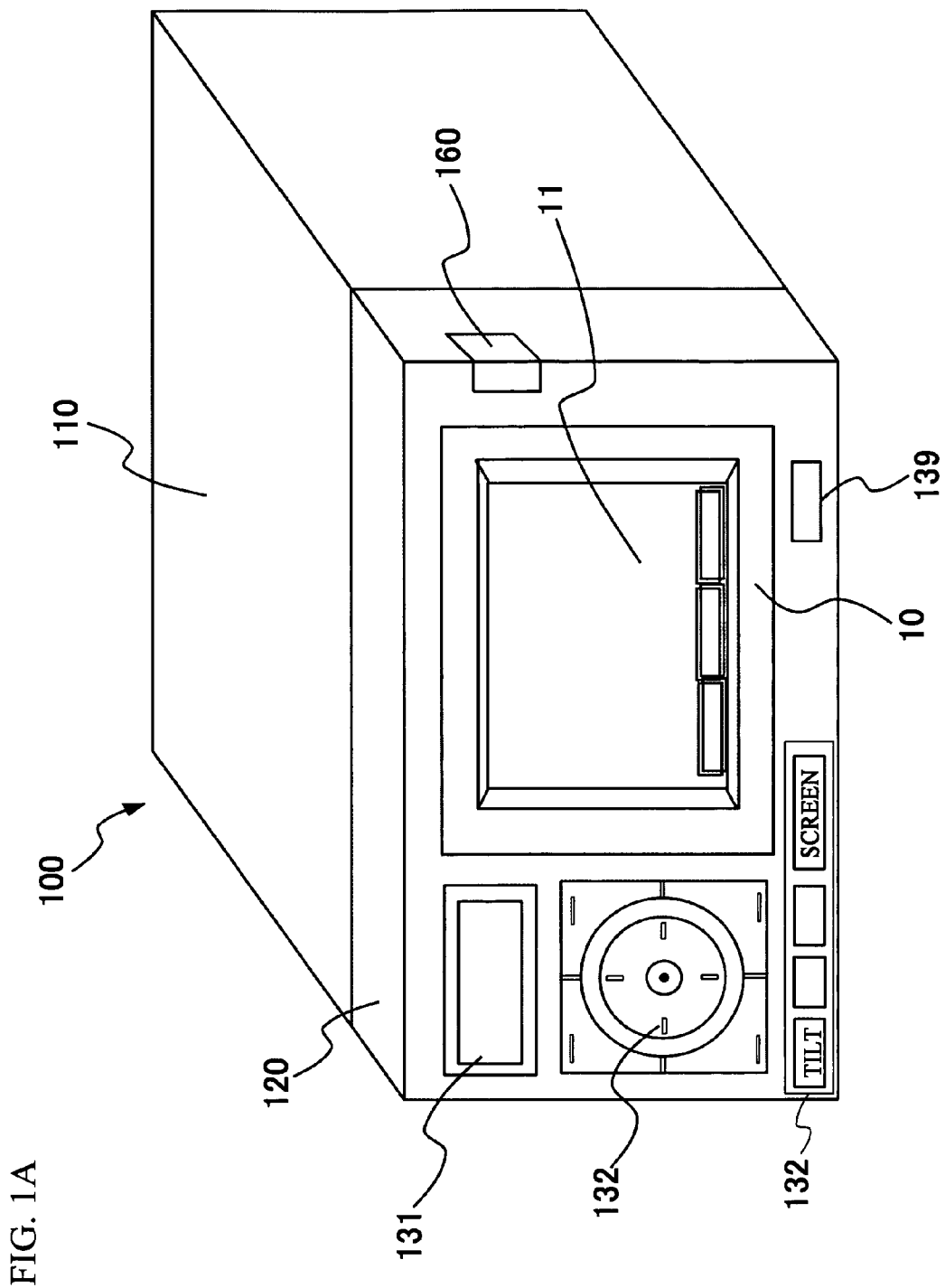

FIG. 1A and FIG. 1B show exterior views of an in-vehicle system 1, as an example of an electronic system. As shown in FIG. 1A and FIG. 1B, the in-vehicle system 1 is composed of: an in-vehicle apparatus 100 (electronic apparatus); and a portable apparatus 10 (portable apparatus) with navigation capabilities. The portable apparatus 10 can be used after being attached at a front face portion 120 of the in-vehicle apparatus 100, as shown in FIG. 1A, and can be also used after being detached from the in-vehicle apparatus 100, as shown in FIG. 1B.

The in-vehicle apparatus 100 is capable of playing radio broadcasting or playing music data recorded on a memory medium such as a CD (Compact Disk) or the like, and the in-vehicle apparatus 100 includes: an in-vehicle apparatus main body 110 having a CD player and a CD insertion/ejection slot; and the front face portion 120 having a display portion 131 and an operating portion (main operating portion) 132.

The portable apparatus 10 has navigation capabilities of searching for a guiding path to a destination and displaying the searched guiding path over a map.

Figure 2:
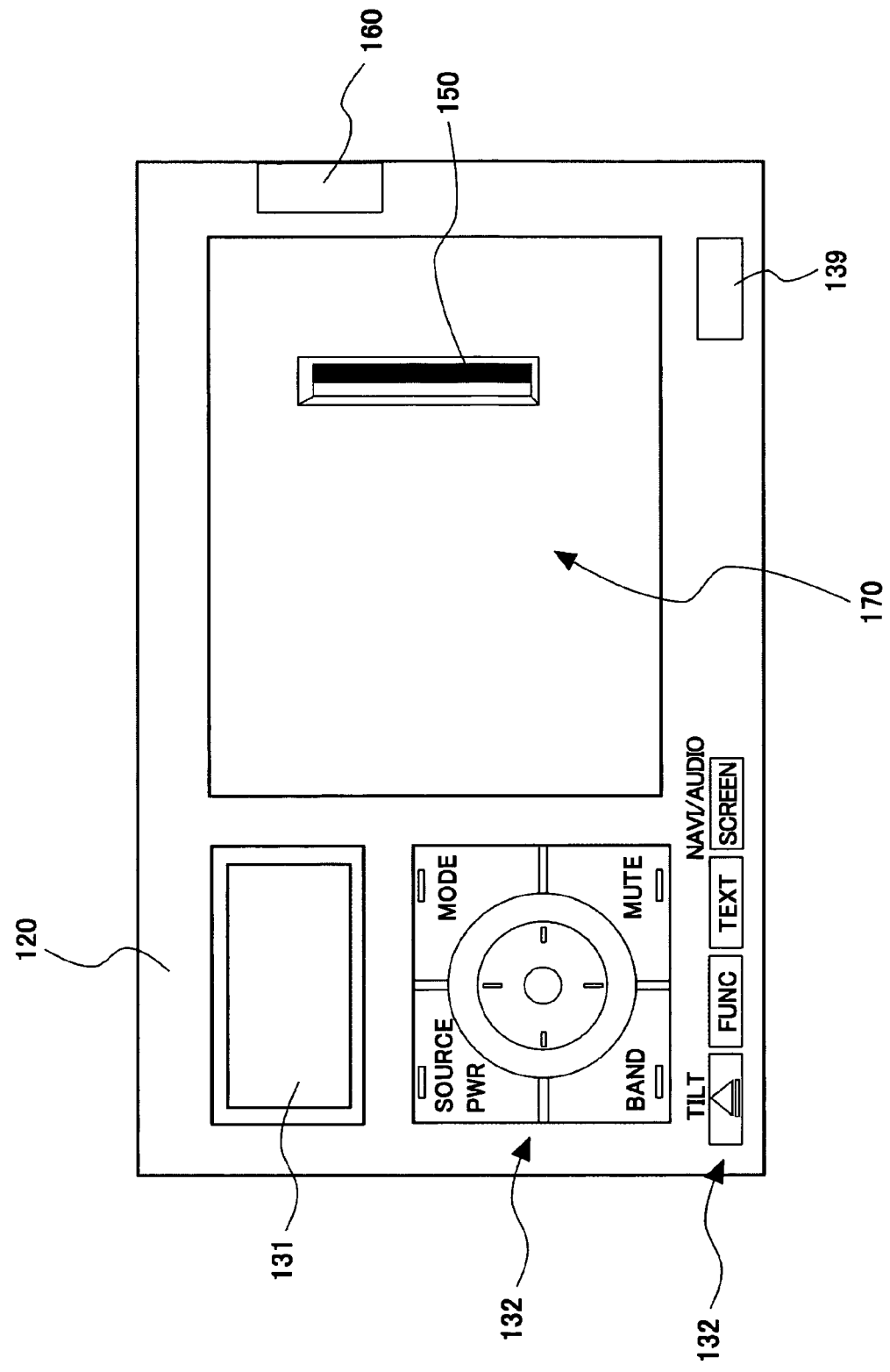
FIG. 2 is a schematic view of a portable apparatus taken out of an in-vehicle apparatus.

FIG. 2 shows the portable apparatus 10 taken out of the in-vehicle apparatus 100. There is provided a housing portion 170 in which a recess portion is defined for attaching the portable apparatus 10, at the front face portion 120 of the in-vehicle apparatus 100. The housing portion 170 is provided with: a connector 150 (housing portion side connector) for electrically coupling the in-vehicle apparatus 100 and the portable apparatus 10; and a lock mechanism (not shown) for securing the portable apparatus 10 to the front face portion 120. When a detach button 160 (detach operating portion) provided at the front face portion 120 is operated, a lock mechanism, not shown, is unlocked and the portable apparatus 10 is detachable from the in-vehicle apparatus 100.

Figure 3:
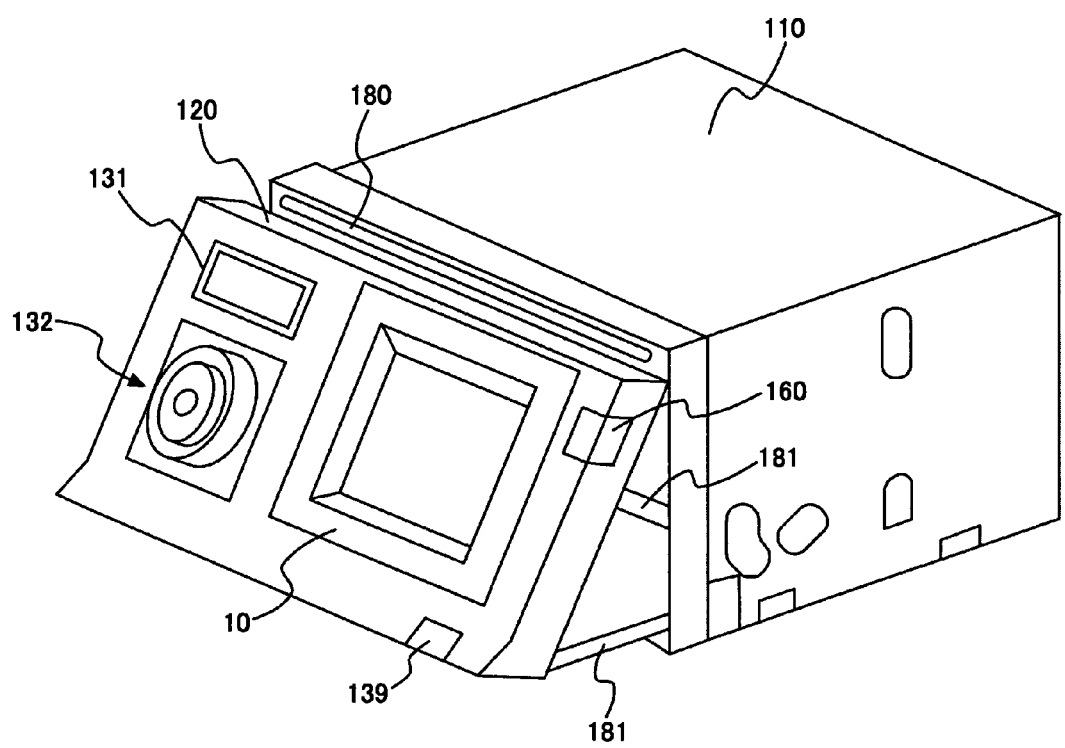
FIG. 3 is a schematic view showing a state of tilting a front face portion against the main body of the in-vehicle apparatus to expose a CD insertion/ejection slot.

FIG. 3 shows a state of tilting the front face portion 120 against the in-vehicle apparatus main body 110 to expose a CD insertion/ejection slot 180.

By driving a slider 181 shown in FIG. 3 with a drive mechanism, not shown, the front face portion 120 can be tilted against the in-vehicle apparatus main body 110. By tilting operation, the CD insertion/ejection slot 180 provided in the in-vehicle apparatus main body 110 is exposed, so a CD can be inserted or ejected. There is provided an operation button (a tilt/eject button 132a shown in FIG. 6), at the front face portion 120 of the in-vehicle apparatus 100, and a tilt angle can be set according to the operation of the button.

Figure 4:
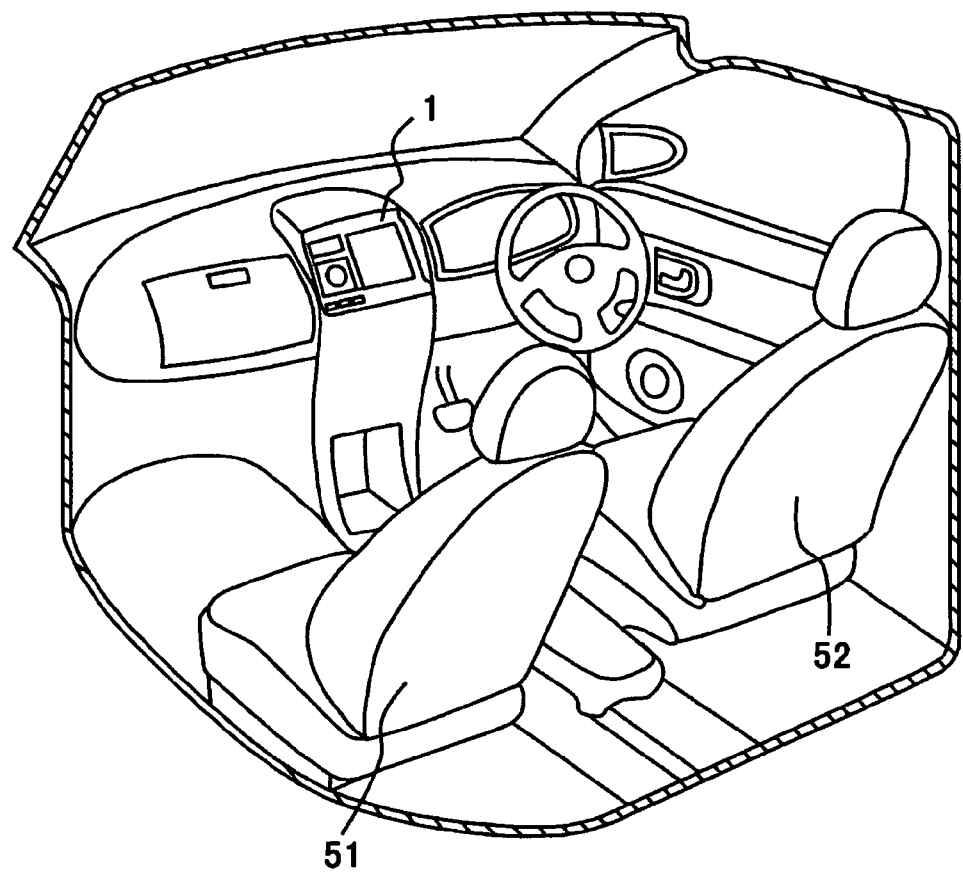
FIG. 4 illustrates an example of mounting the in-vehicle system in a vehicle.

FIG. 4 illustrates an example of mounting the in-vehicle system 1 in a vehicle.

The in-vehicle system 1 is disposed in a dashboard portion substantially in the middle of a front-passenger's seat 51 and a driver's seat 52, as shown in FIG. 4, for example.

Here, a GPS (Global Positioning System) antenna, not shown, of a GPS information receiver 133 is located on the dashboard or attached at an inner side of a front glass.

Figure 5:
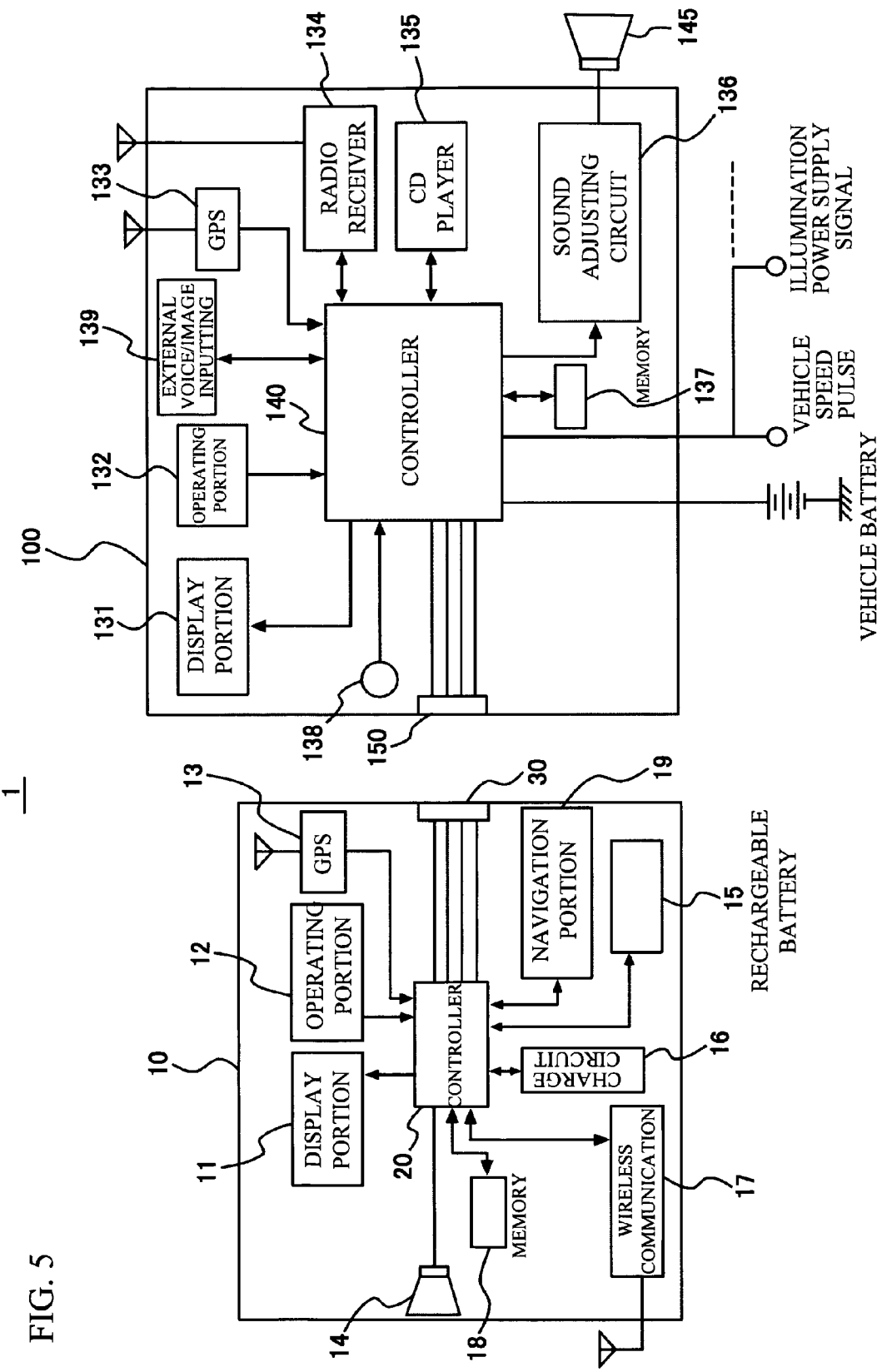
FIG. 5 is a block diagram showing a schematic configuration of the in-vehicle system.

FIG. 5 is a block diagram showing a schematic configuration of the in-vehicle system 1.

The in-vehicle apparatus 100 and the portable apparatus 10 are electrically connected by connectors. The connector 150 is provided at the in-vehicle apparatus 100 side, and a connector 30 is provided at the portable apparatus 10. By connecting the connectors 150 and 30, various signals are sent and received between the in-vehicle apparatus 100 and the portable apparatus 10 to function as the in-vehicle system 1. The connectors 150 and 30 are respectively provided with power supply terminals for supplying power to the portable apparatus 10 from the battery of the vehicle. When the portable apparatus 10 is connected to the in-vehicle apparatus 100 and the power is supplied to the in-vehicle apparatus 100, the power is also supplied to the portable apparatus 10 via the power supply terminals.

The in-vehicle apparatus 100 is provided with: the display portion 131; the operating portion 132; the GPS information receiver 133; a radio receiver 134; a CD player 135; a sound adjusting circuit 136; a memory 137; a microphone 138; an external voice/image inputting portion 139; a controller 140; and the connector 150. The in-vehicle apparatus 100 is activated by supplying the power from the battery of the vehicle, when the engine key is positioned at ACC or IG.

Hereinafter, the function of each part will be described in detail.

The display portion 131 is provided with a liquid crystal panel and a backlight, and displays a frequency of the received broadcasting, a track number of music being played, a music name being played, and the like, according to the 13-segment display.

Figure 6:
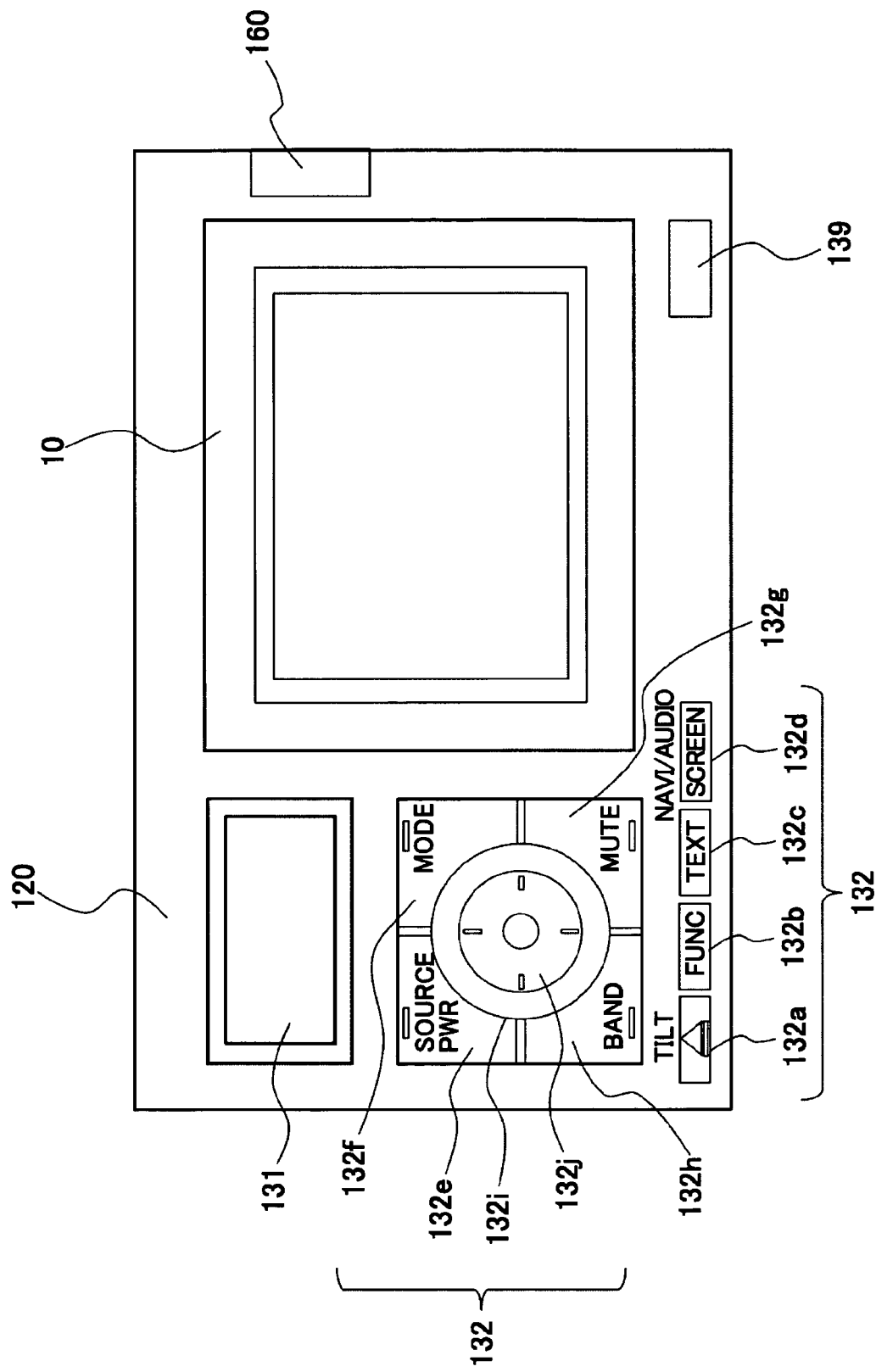
FIG. 6 is a front face view of the front face portion.

The operating portion 132 is provided for selectively changing the operation mode of the in-vehicle apparatus 100, and for operating in various modes that have been changed. The operating portion 132 is provided with a group of buttons including: the tilt/eject button 132a; a function (represented as FUNC in the drawing)/AF button 132b; a TEXT button 132c; a SCREEN button 132d; a SOURCE/PWR button 132e; a MODE button 132f; a MUTE button 132g; a BAND change button 132h; a rotary button 132i; a cross key/enter key button 132j, as shown in FIG. 6.

Here, a description will be given of switching the display between the portable apparatus 10 and the in-vehicle apparatus 100.

Firstly, the in-vehicle apparatus 100 turns on when the SOURCE/POWER button 132e of the in-vehicle apparatus 100 is pushed. When the SOURCE/POWER button 132e is pushed for a short period of time while the portable apparatus 10 is on, the source is changed to the CD playing or radio broadcasting. At this time, the information on the selected source is displayed on the display portion 131 of the in-vehicle apparatus 100, and the navigation image is displayed on a display portion 11 of the portable apparatus 10, without relation to the source.

Next, when the SCREEN button 132d is pushed, the navigation image displayed on the display portion 11 of the portable apparatus 10 can be changed to an image corresponding to the source selected at the in-vehicle apparatus 100.

Figure 7A:
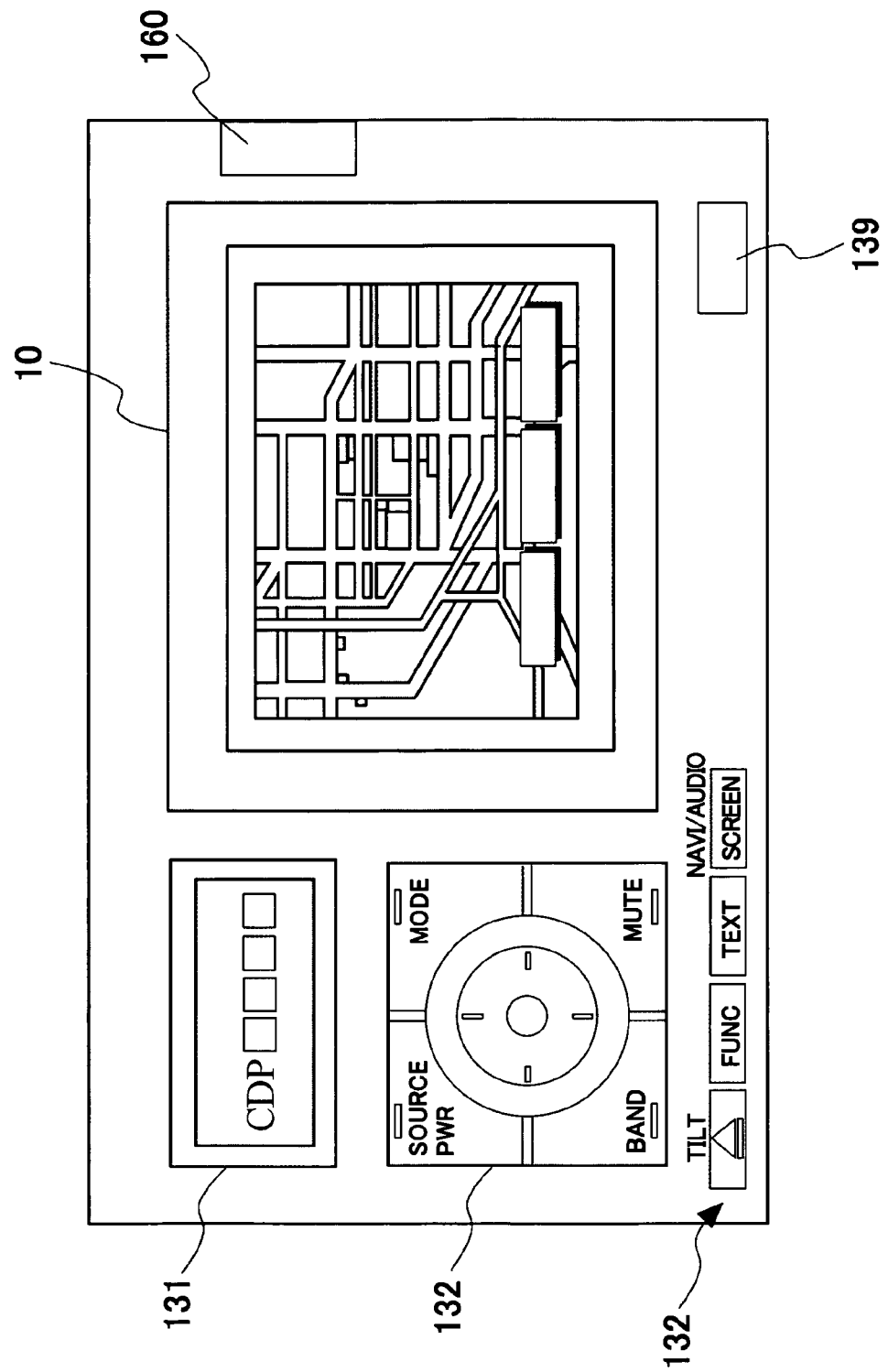
FIG. 7A through FIG. 7C are explanatory views of the operation of the in-vehicle apparatus and display examples of the portable apparatus in accordance therewith.

FIG. 7A shows a state where the portable apparatus 10 is attached to the in-vehicle apparatus 100 while the CD is being played and a navigation image is being displayed on the portable apparatus 10.

When the SOURCE/POWER button 132e is pushed in the state of FIG. 7A and the source is changed from the CD playing to the radio broadcasting, the information on the radio source is displayed on the display portion 131. Also, the navigation image remains being displayed on the display portion 11 of the portable apparatus 10.

Figure 7B:
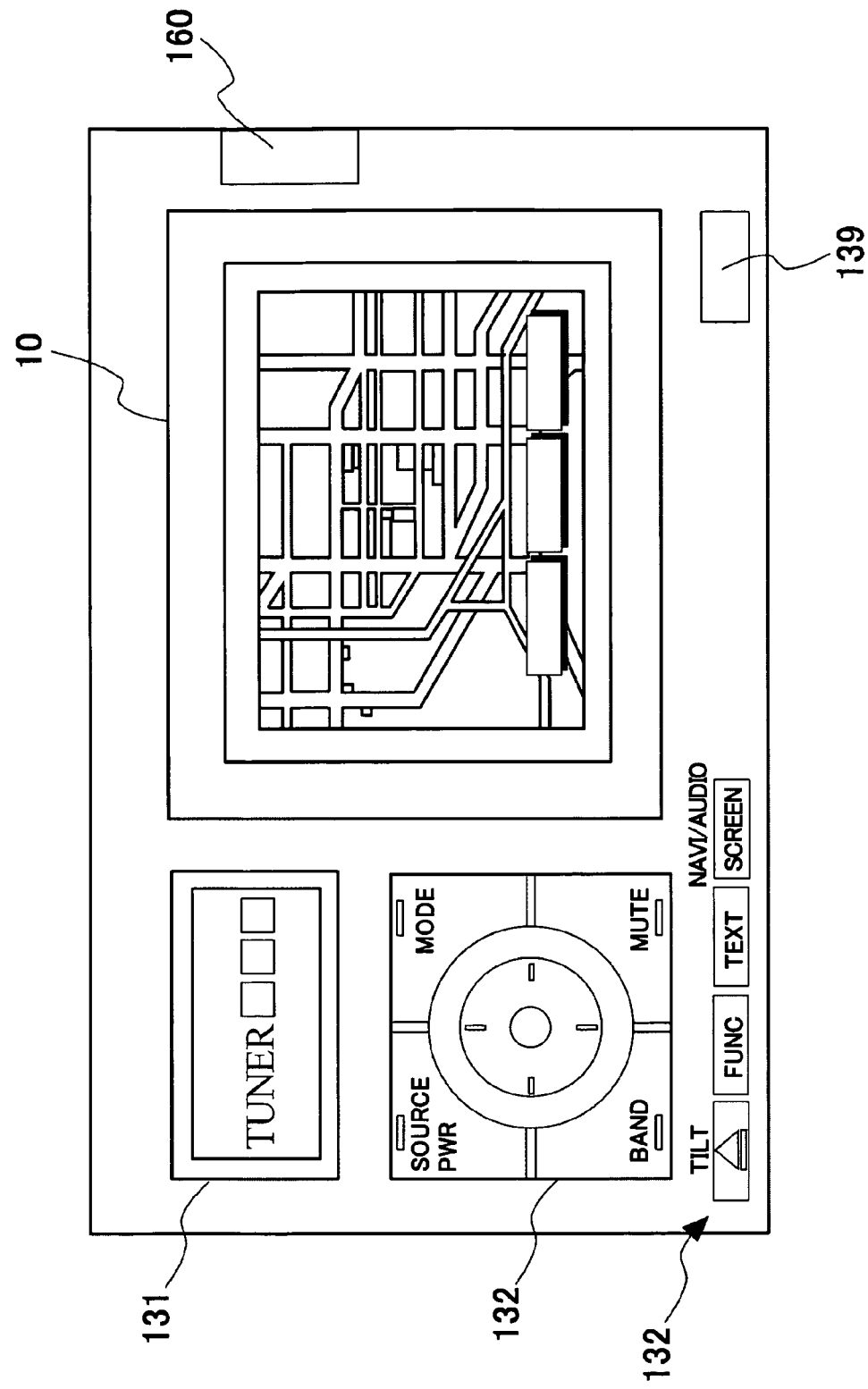
Figure 7C:
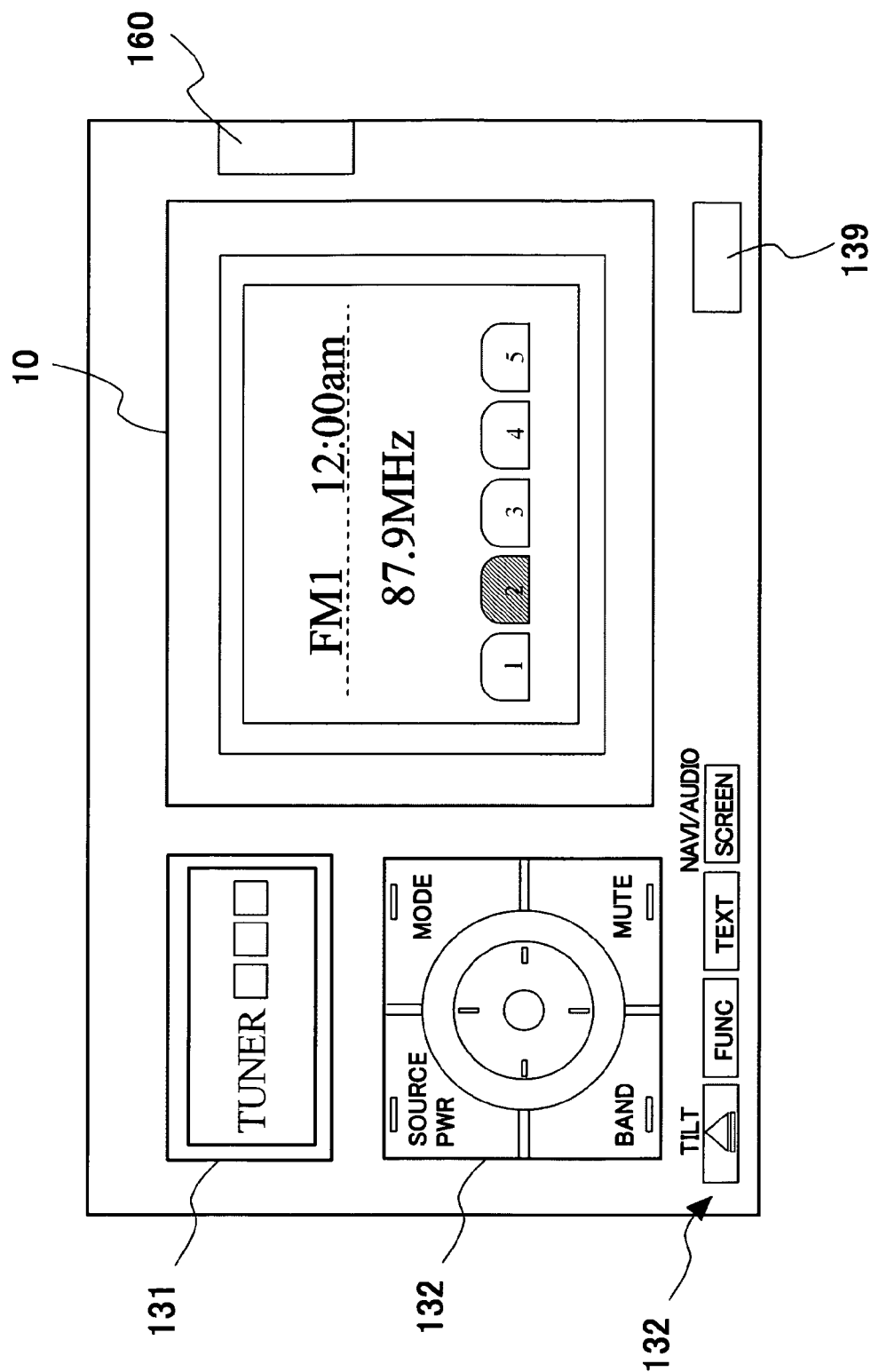

Then, when a user pushes the SCREEN button 132d, the image corresponding to the source being processed by the in-vehicle apparatus 100 is displayed on the display portion 11 of the portable apparatus 10, as shown in FIG. 7C (radio image is displayed in FIG. 7C). A touch panel, described later, is provided in the display portion 11 of the portable apparatus 10. A user is capable of operating the source currently being processed, by selecting the operation buttons displayed on the display portion 11.

In addition, when the SCREEN button 132d is pushed with the radio screen being displayed on the display portion 11, it is possible to return to the navigation image from the radio image, as shown in FIG. 7B. When the portable apparatus 10 is removed from the in-vehicle apparatus 100, the operation of the SCREEN button 132d is invalid.

Furthermore, when a USB (Universal Serial Bus) or the like is connected to the external voice/image inputting portion 139 with the portable apparatus 10 removed from the in-vehicle apparatus 100, it is possible to prevent the change to the USB source, even if the SOURCE/POWER button 132e is pushed.

Referring back to FIG. 5, the GPS information receiver 133 includes a GPS antenna and a tuner, and receives GPS signals from a satellite. The GPS signal received by the GPS information receiver 133 is output through the controller 140, the connector 150, the connector 30, and a controller 20, to a navigation portion 19 of the portable apparatus 10, and then the position of the vehicle in which the in-vehicle apparatus 100 having the portable apparatus 10 therein is determined based on the GPS signal.

Herein, the GPS signal may be output to the navigation portion of the portable apparatus 10 through the controller 140, instead of through the controller 20. Alternatively, the GPS information receiver 133 may be composed of the GPS antenna only, so that the GPS signal received by the GPS antenna may be output to the tuner of a GPS information receiver 13, described later, without through the controller 140 or the controller 20. Further alternatively, the GPS signal may be output through the controller 20 to the tuner of the GPS information receiver 13 without through the controller 140. Various changes may be made as necessary.

The radio receiver 134 has an antenna and a tuner, receives broadcast waves such as AM broadcasting, FM broadcasting, and sound multiplex broadcasting, outputs stereo audio signals, receives and demodulates multiplex data, and outputs the demodulated signal to the controller 140.

The CD player 135 reads the data stored in the CD, reproduces the data on a speaker 145, and outputs the reproduced signal to the controller 140.

Herein, the demodulated signal output from the radio receiver 134 may be output to the sound adjusting circuit 136, described later, without through the controller 140.

The sound adjusting circuit 136 implements signal processing such as volume control or tone control on the sound signal received or demodulated by the radio receiver 134 or the sound signal reproduced by the CD player 135, and then outputs the processed signal to the speaker 145.

The memory 137 may be composed of a RAM (Random Access Memory) from which data is readable and into which data is writable, and temporarily stores information necessary for control.

The microphone 138 is provided for hands-free communication, and takes in user's voices in the vehicle.

The external voice/image inputting portion 139 is provided with a connection terminal with an external device such as a USB memory, portable audio device, or the like so that an audio signal or data from the external device may be input. The external voice/image inputting portion 139 then sends the signal or data to the controller 140, and outputs the audio signal, data, or the like to the external device connected.

The controller 140 controls the radio receiver 134, the CD player 135, and the sound adjusting circuit 136, according to the operation by means of the operating portion 132.

Also, the controller 140 outputs various signals through the connector 150 to the portable apparatus 10, and controls the in-vehicle apparatus 100 on the basis of the various signals input from the portable apparatus 10. For example, the controller 140 outputs the GPS signal received by the GPS information receiver 133 or the audio signal input through the microphone 138, to the portable apparatus 10 by way of the connector 150.

Here, the audio signal input through the microphone 138 may be output to the portable apparatus 10 by way of the connector 150, without through the controller 140.

In addition, the voice on communication over a mobile phone connected to the portable apparatus 10 is input through the connector 150 into the controller 140, and is then output through the sound adjusting circuit 136 to the speaker 145.

Furthermore, the controller 140 acquires an operation signal corresponding to a menu image of various modes displayed on the display portion 11 of the portable apparatus 10, from the controller 20 of the portable apparatus 10, and then controls the radio receiver 134 and the CD player 135.

Also, the power is supplied to the controller 140 from the battery mounted in the vehicle. When the portable apparatus 10 is connected, the controller 140 outputs the power supplied from the battery to the portable apparatus 10.

Here, a vehicle speed pulse and an illumination power supply signal are input into the controller 140 from a vehicle. The controller 140 transfers such input vehicle speed pulse to the controller 20 of the portable apparatus 10.

Meanwhile, the vehicle speed pulse may be configured not to be input into the in-vehicle apparatus 100.

Next, a description will be given of the portable apparatus 10. The portable apparatus 10 is provided with: the display portion 11; an operating portion 12; the GPS information receiver 13; a speaker 14; a rechargeable battery 15; a charge circuit 16; a wireless communication transmitter/receiver 17; a memory 18; the navigation portion 19; the controller 20; and the connector 30.

Hereinafter, functions of the components will be described in detail.

The display portion 11 is provided with a liquid crystal panel and a backlight, and is capable of displaying map information generated by the navigation portion 19 and guiding path information to a destination, the received broadcasting frequency transferred from the in-vehicle apparatus 100, a music track number played, music name played, and the like.

Here, the display portions 11 and 131 may employ a flat panel display other than a liquid crystal panel. Examples are organic light emitting display, plasma display panel, cold-cathode flat panel display, or the like.

The operating portion 12 includes a power button 55 (see FIG. 8A) to turn on or off the power of the portable apparatus 10. The touch panel is, for example, disposed on the display screen. When the touch panel is touched by a finger or a dedicated pen, the touched position is detected to determine whether or not there is an input operation. The power button 55 will be described later.

The GPS information receiver 13 includes an antenna and a tuner, and receives the GPS signal from a satellite. Such received GPS signal is output to the navigation portion 19, and the vehicle location is detected based on the GPS signal. Meanwhile, the in-vehicle apparatus 100 is also provided with the GPS information receiver 133. However, when the portable apparatus 10 is attached to the in-vehicle apparatus 100, the location of the vehicle in which the in-vehicle apparatus 100 having the portable apparatus 10 therein is mounted is specified by use of the GPS signal (and the vehicle speed pulse) received by the GPS information receiver 133. When the portable apparatus 10 is used alone, the location thereof is specified by use of the GPS signal received by the GPS information receiver 13.

The speaker 14 is provided for outputting the audio information of the navigation portion 19, and outputs the audio information only when the portable apparatus 10 is detached from the in-vehicle apparatus 100, namely, used alone separately.

The rechargeable battery 15 supplies power to each portion of the portable apparatus 10. When the portable apparatus 10 is attached to the in-vehicle apparatus 100, the power is supplied through the power supply terminals of the connector 30 from the battery of the vehicle and the rechargeable battery 15 is charged by the charge circuit 16. Also, the charge circuit 16 is supplied with the power from the connection terminal through a USB slot 57 (see FIG. 8A), and the rechargeable battery 15 can be charged.

The wireless communication transmitter/receiver 17 sends and receives the voice on communication over a mobile phone, and acquires the information used for navigation over the mobile phone. For example, Bluetooth, which is a wireless transmission system at 2.4 GHz band, is used for the wireless communication transmitter/receiver 17.

The memory 18 may be a RAM from which data is readable and into which the data is writable, and temporarily stores the information read for each control.

The navigation portion 19 includes a map information storing portion in which the map information used for navigation acquired from an SD (Secure Digital) card or the USB memory is stored, determines current location information with GPS signal from the GPS information receiver 133 or the GPS information receiver 13, and creates an image for the navigation operation. The created map may be displayed on the display portion 11. When the in-vehicle apparatus 100 and the portable apparatus 10 are connected, the vehicle speed pulse is acquired from the vehicle so that the accuracy of the location detection of the vehicle in which the portable apparatus 10 is mounted in the in-vehicle apparatus 100 can be improved.

Here, the map information may be retained in the portable apparatus 10.

The controller 20 controls each part of the portable apparatus 10. Also, the controller 20 outputs various signals to the in-vehicle apparatus 100 through the connector 30, and controls the portable apparatus 10 based on the various signals input from the in-vehicle apparatus 100. For example, the controller 20 acquires the GPS signal received by the GPS information receiver 133 of the in-vehicle apparatus 100 and the vehicle speed pulse from the controller 140 of the in-vehicle apparatus 100, and outputs the GPS signal and the vehicle pulse to the navigation portion 19. Also, the controller 20 acquires the audio signal input by the microphone 138 of the in-vehicle apparatus 100 from the controller 140 of the in-vehicle apparatus 100, and controls the navigation portion 19 according to the audio signal. That is to say, the navigation portion 19 can be operated in a hands-free manner. The voice on communication over the mobile phone connected to the wireless communication transmitter/receiver 17 is output to an in-vehicle apparatus side through the connector 30, and is caused to output from the speaker 145 of the in-vehicle apparatus 100. The operation signal on the menu screen or content screen displayed on the display portion 11 is output to the controller 140 of the in-vehicle apparatus 100 through the connector 30. The controller 140 controls the radio receiver 134 or the CD player 135 according to the operation signal transmitted from the controller 20 of the portable apparatus 10.

Figure 8A:
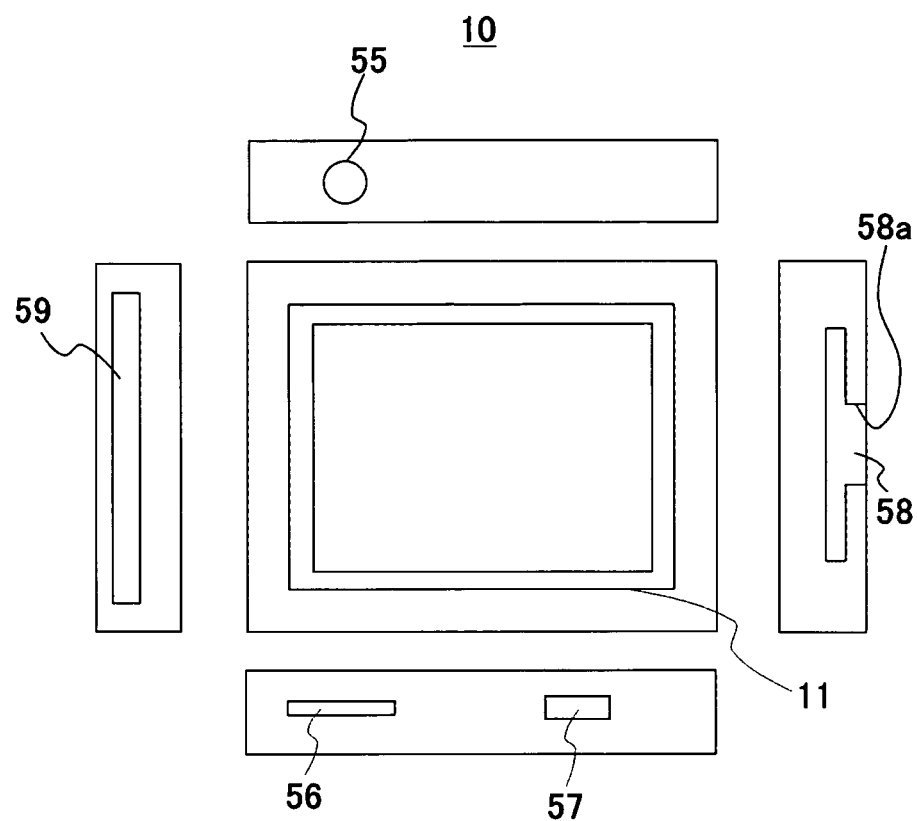
FIG. 8A and FIG. 8B are schematic views of the portable apparatus.
Figure 8B:
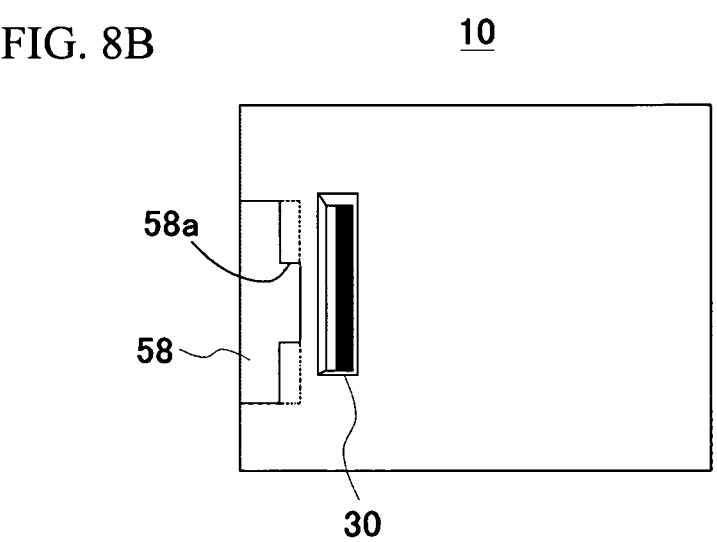

FIG. 8A shows a front view, top view, bottom view, left-side view, and right-side view of the portable apparatus 10. FIG. 8B is a back view of the portable apparatus 10.

The top face of the portable apparatus 10 is provided with the power button 55 for turning on or off the power of the portable apparatus. The bottom face of the portable apparatus 10 is provided with: an SD (Secure Digital) memory card slot 56; and a USB slot 57. By inserting the SD card or the USB memory into the slots, the controller 20 reads out the map information from the SD card or the USB memory and outputs the map information to the navigation portion 19.

The power of the portable apparatus 10 is turned on or off, when the portable apparatus is attached to the in-vehicle apparatus 100. Also, the power is operated on the basis of on or off operation of the power button 55, when the portable apparatus 10 is removed from the in-vehicle apparatus 100 and used alone separately.

Furthermore, on the backside of the portable apparatus 10, there is provided the connector 30 for establishing electrical connection with the in-vehicle apparatus 100.

At an edge portion of the right-side face and that of the back face of the portable apparatus 10, there is provided a latch portion 58 latched with a lock mechanism (not shown) provided at the in-vehicle apparatus 100 side.

The latch portion 58 is defined in a recess shape.

On the left-side surface of the portable apparatus 10, there is provided an engagement portion 59 extending in a vertical direction. The engagement portion 59 is defined in a recess shape.

Next, a description will be given of a structure of the front face portion 120.

Figure 9:
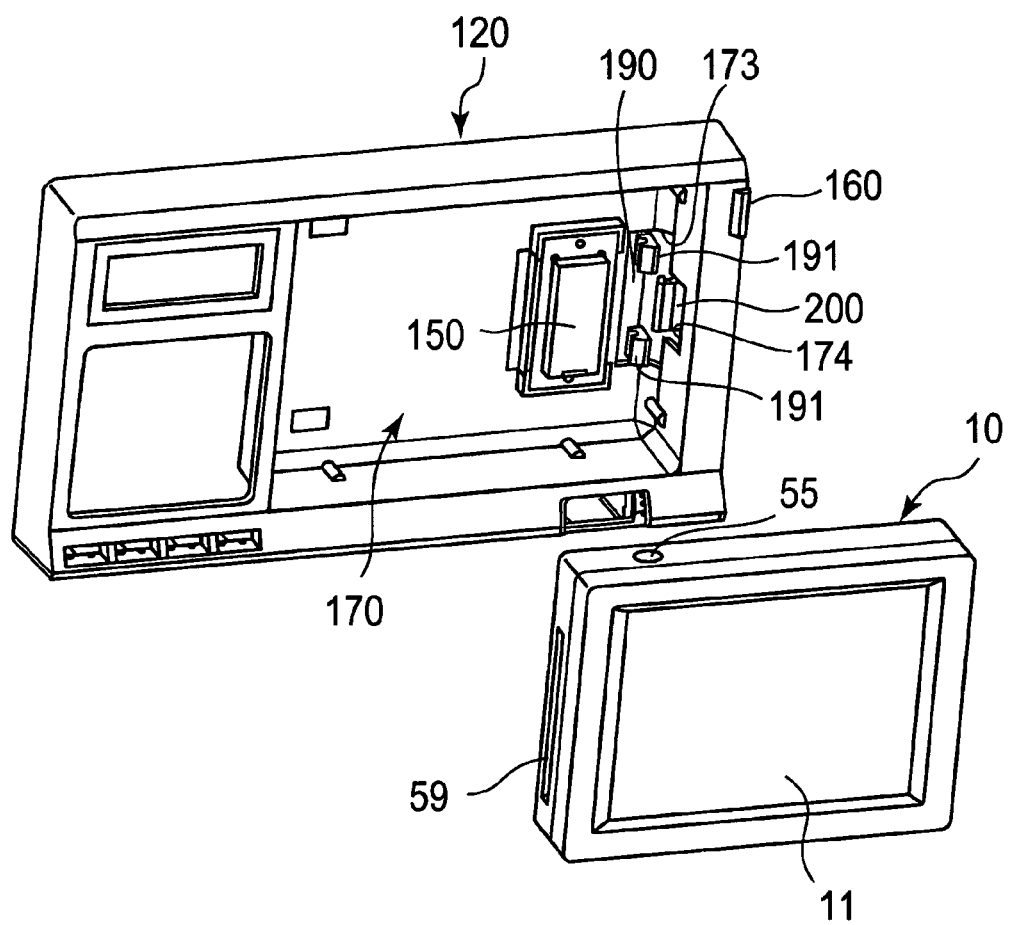
FIG. 9 shows perspective views of the portable apparatus and the front face portion, as viewed from front left side.
Figure 10:
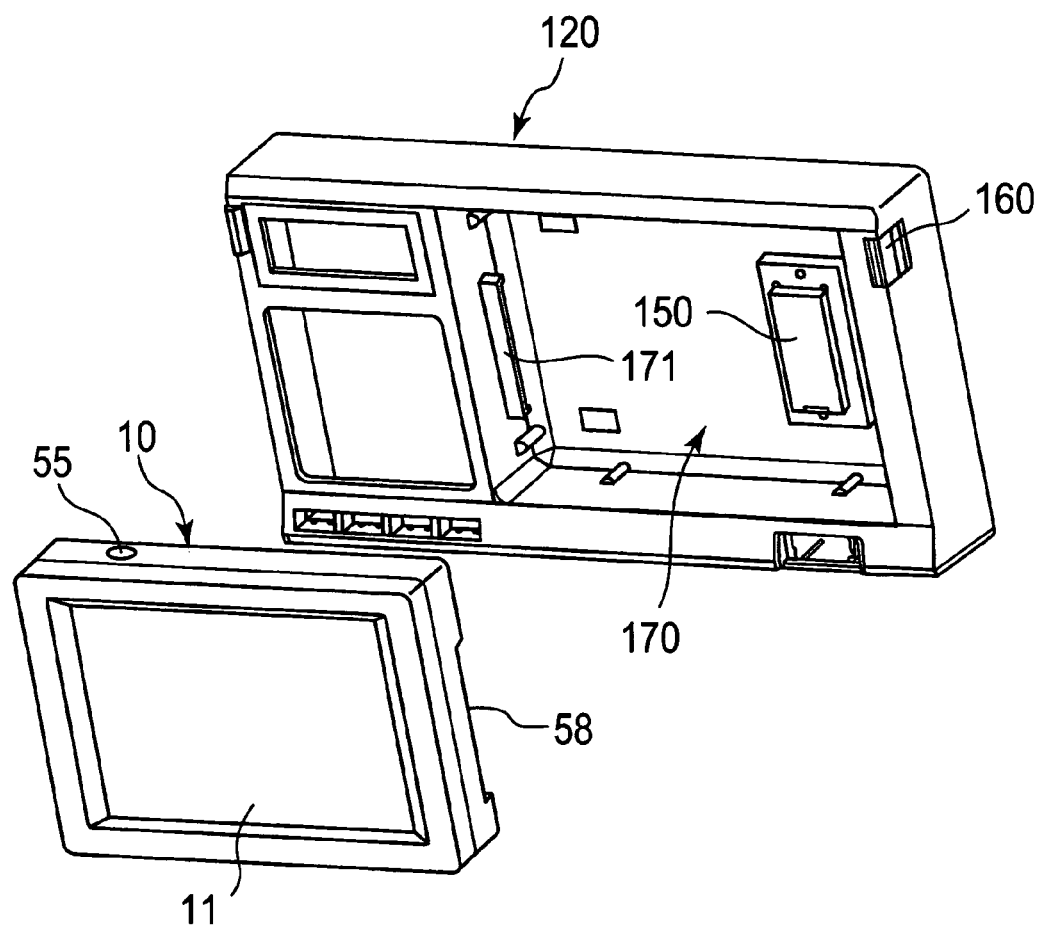
FIG. 10 shows perspective views of the portable apparatus and the front face portion, as viewed from front right side.
Figure 11:
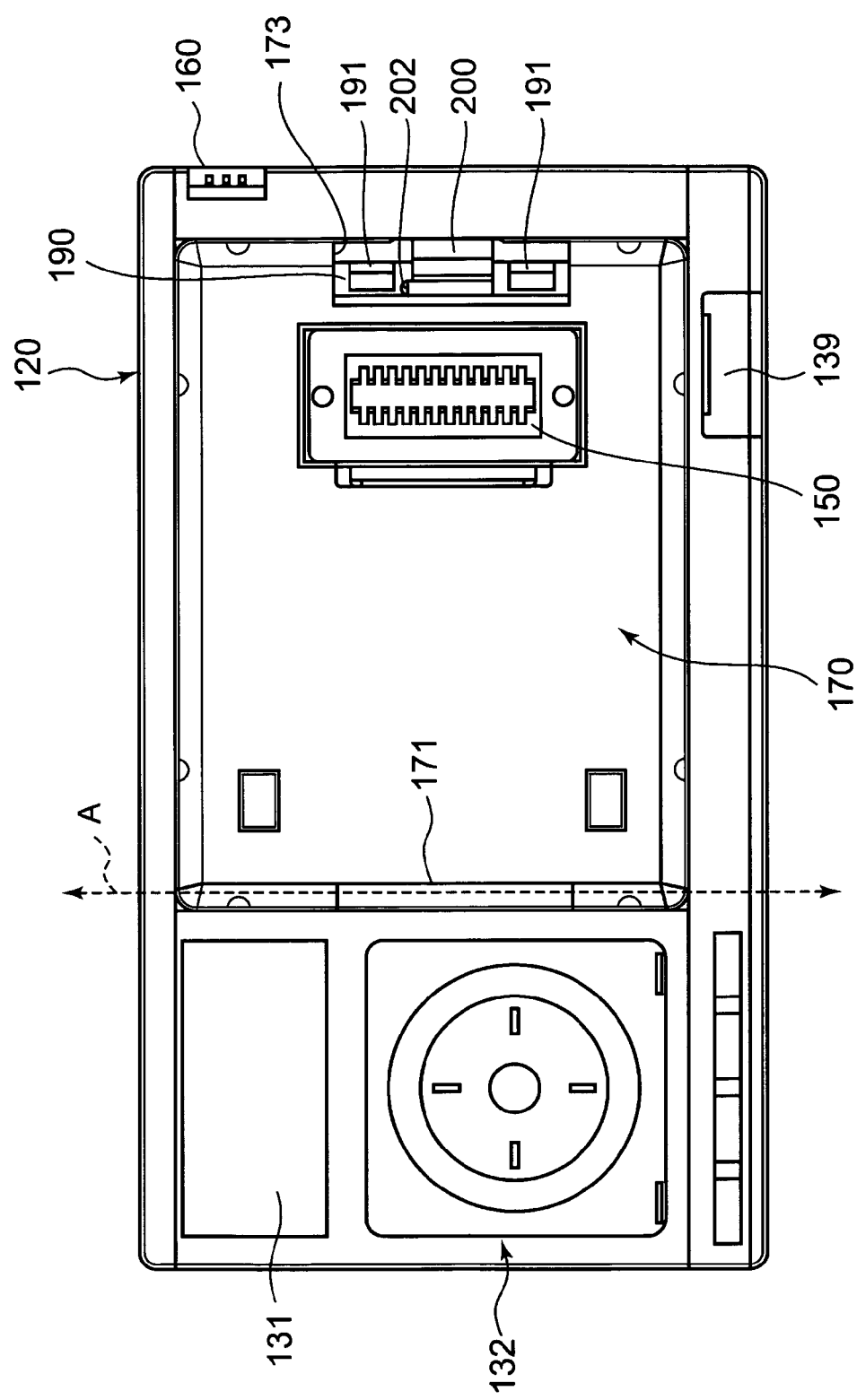
FIG. 11 shows a front view of the front face portion.

FIG. 9 through FIG. 11 are external views showing the structure of the front face portion 120 in detail. FIG. 9 shows perspective views of the portable apparatus 10 and the front face portion 120, as viewed from front left side. FIG. 10 shows perspective views of the portable apparatus 10 and the front face portion 120, as viewed from front right side. FIG. 11 shows a front view of the front face portion 120.

Herein, FIG. 9 and FIG. 10 respectively show the front face portion 120 and the portable apparatus 10 with the display portion 131, the operating portion 132, and the like removed. Also, in FIG. 11, the operating portion 132 is shown in a simplified manner.

The housing portion 170 is provided with a projection portion 171 (guide mechanism, support mechanism (second engagement portion)). The projection portion 171 is formed at an inner wall of the housing portion 170 at the operating portion 132 side, and extends in a vertical direction.

There is also defined the recess portion 59 extending in a vertical direction, at a side portion of the portable apparatus 10. The projection portion 171 and the recess portion 59 are engaged with each other.

In addition, an opening portion 173 is defined at an edge portion of the inner wall opposing the inner wall in which the projection portion 171 is formed. The opening portion 173 is defined to extend in a vertical direction and a cutaway portion 174 is defined from the opening portion 173 towards the front side of the front face portion 120.

A lock mechanism 190 is partially exposed from the opening portion 173, and a push-out member 200 is partially exposed from the opening portion 173 and the cutaway portion 174.

Next, a description will be given of the detach button 160, the lock mechanism 190, and the push-out member 200 in detail.

Figure 12:
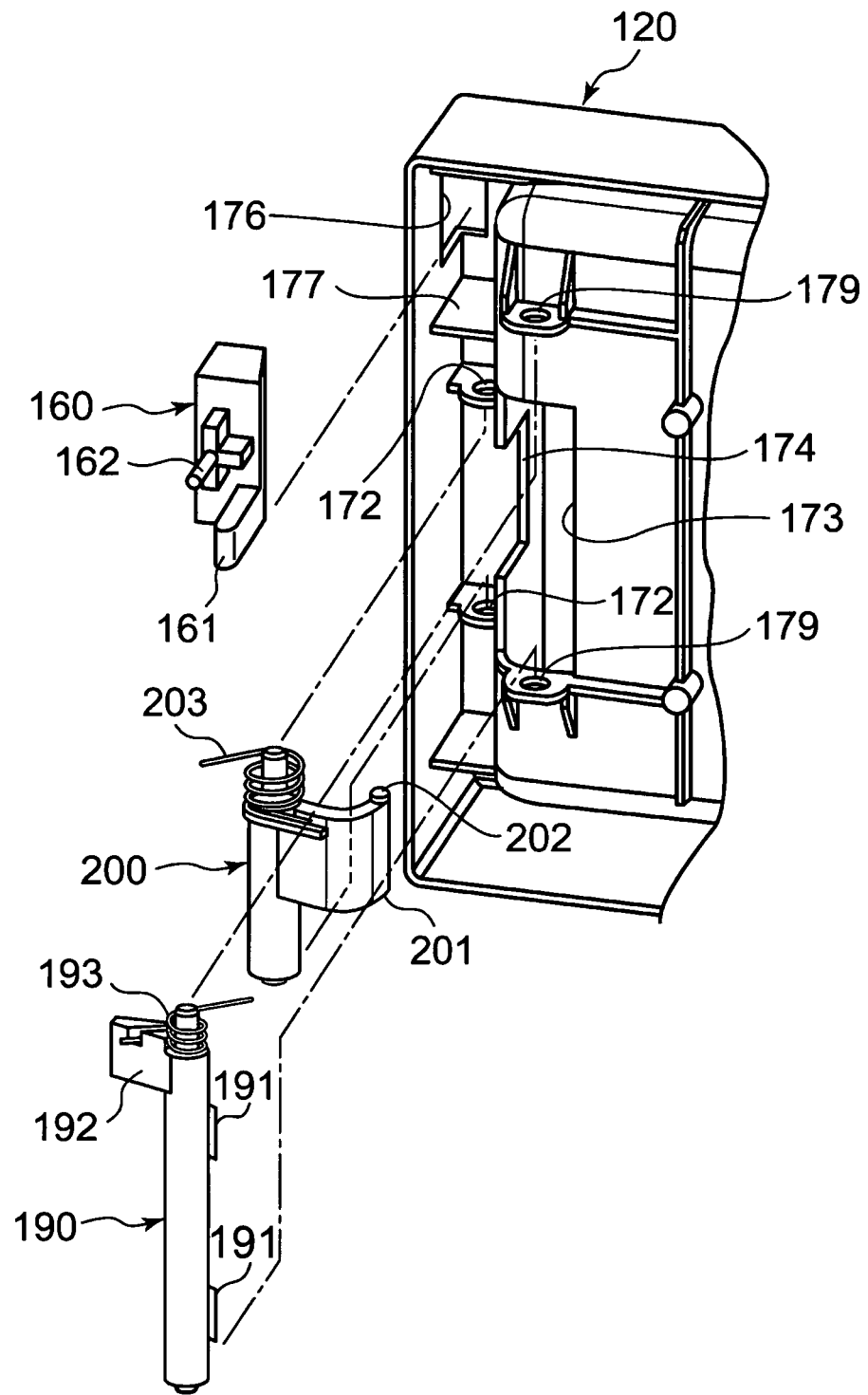
FIG. 12 is an exploded perspective view of the front face portion, as viewed from the back face.

FIG. 12 is an exploded perspective view of the front face portion 120, as viewed from the back face.

The detach button 160 is provided pushably from an opening portion 176 defined at a corner of the front face portion 120. The detach button 160 is provided with a push portion 161 and a stopper 162. When the detach button 160 is pushed, the stopper 162 is brought into contact with a back face plate, not shown, secured to the back surface of the front face portion 120, and regulates a pushed position of the detach button 160. The position of the detach button 160 is also regulated by a support plate 177 and the inner wall in the periphery of the opening portion 176.

The lock mechanism 190 is rotatably engaged with a shaft opening 179 defined at the back face of the housing portion 170, and is biased by a torsion spring 193 to rotate in a given direction. In addition, the lock mechanism 190 is provided with an engagement nail 191 protruding toward an external radial direction and a pushed portion 192 protruding toward the external radial direction from a different position from the engagement nail 191. Herein, two engagement nails 191 are provided separately in shaft end directions.

The push-out member 200 (eject mechanism, pushing portion) is rotatably engaged with a shaft opening 172, and is biased by a torsion spring 203 to rotate in a given direction. In addition, the push-out member 200 is provided with: an arm portion 201 protruding toward an external radial direction and bent in the partway; and an engagement pin 202 (support mechanism (first engagement portion)) slightly protruding upward in a shaft end direction of the push-out member 200, at an end portion of the arm portion 201.

Figure 13A:
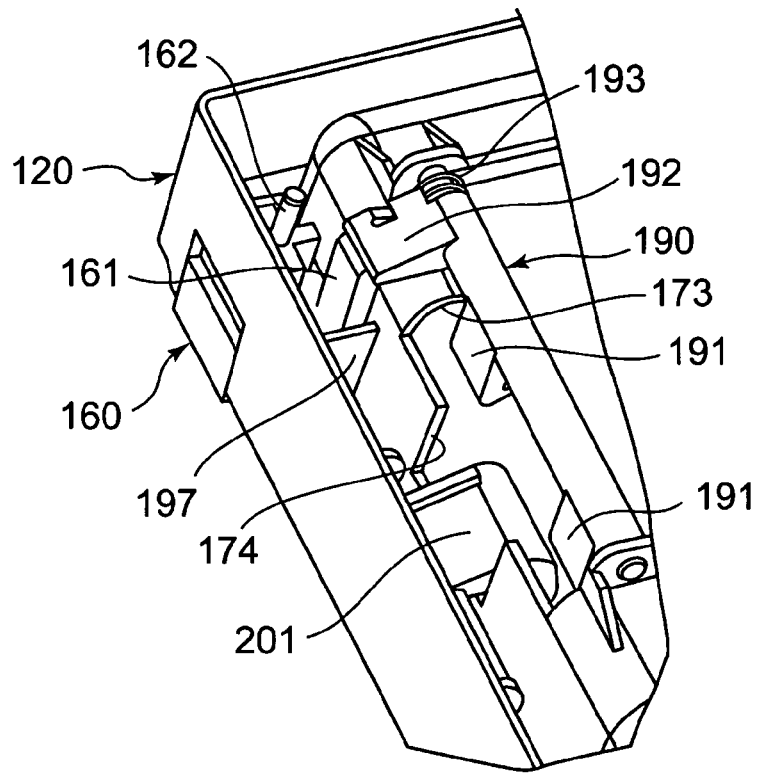
FIG. 13A and FIG. 13B are explanatory views of a lock mechanism of pushing a detach button.
Figure 13B:
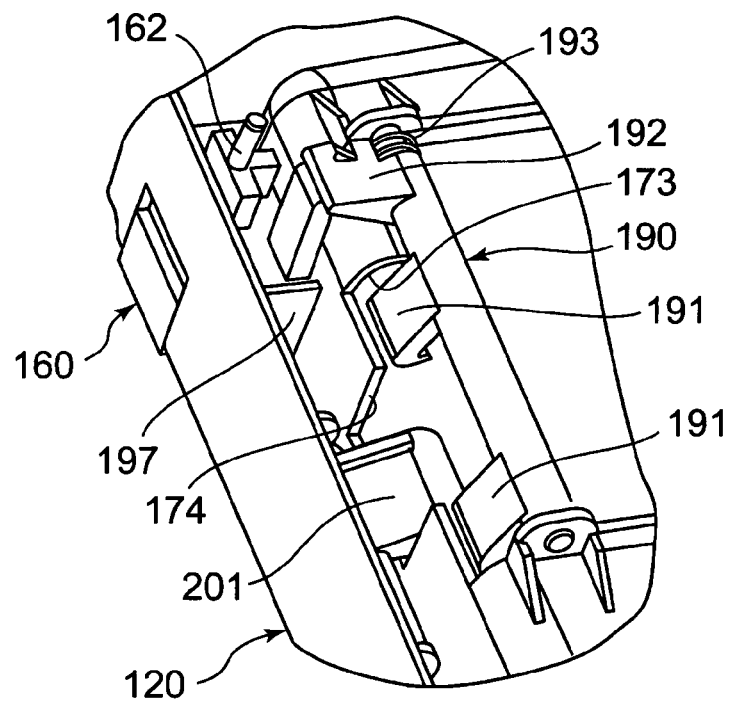

FIG. 13A and FIG. 13B are explanatory views of the lock mechanism of pushing the detach button 160.

As shown in FIG. 13A, the push portion 161 is in contact with the pushed portion 192. At this time, the pushed portion 192 causes the torsion spring 193 to bias the push portion 161 to push forward.

When the push portion 161 is pushed down, as shown in FIG. 13B, the push portion 161 pushes the pushed portion 192 to an opposite direction to the biasing direction of the torsion spring 193 and then the engagement nail 191 turns outward. This disengages the engagement nail 191 from the latch portion 58 when the portable apparatus 10 is attached in the housing portion 170, and the arm portion 201 pushes out the side portion of the portable apparatus 10 from the housing portion 170.

Next, a description will be given of a method of attaching or detaching the portable apparatus 10 and the in-vehicle apparatus 100.

Figure 14A:
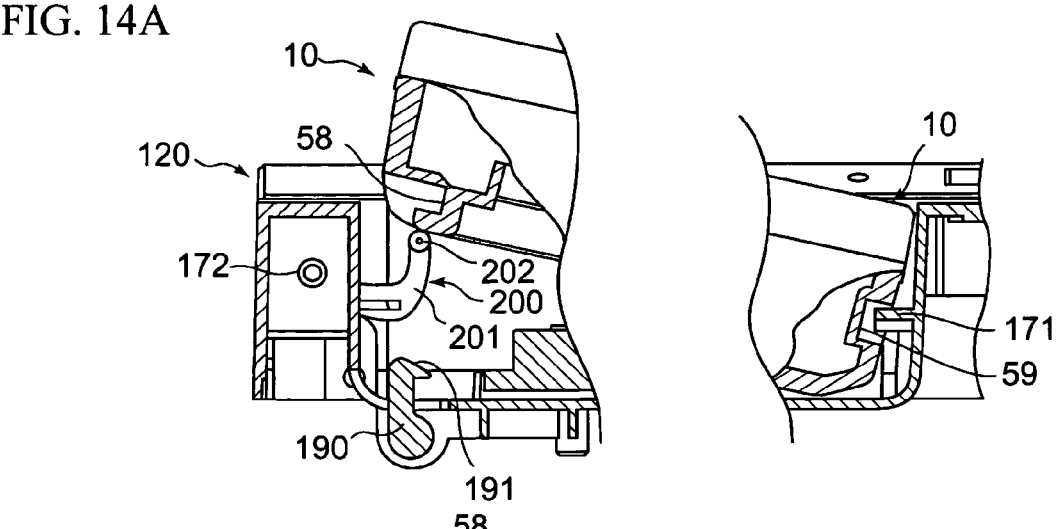
FIG. 14A through FIG. 14C are cutaway cross-sectional views illustrative of the method of attaching or detaching the portable apparatus and the in-vehicle apparatus.
Figure 14B:
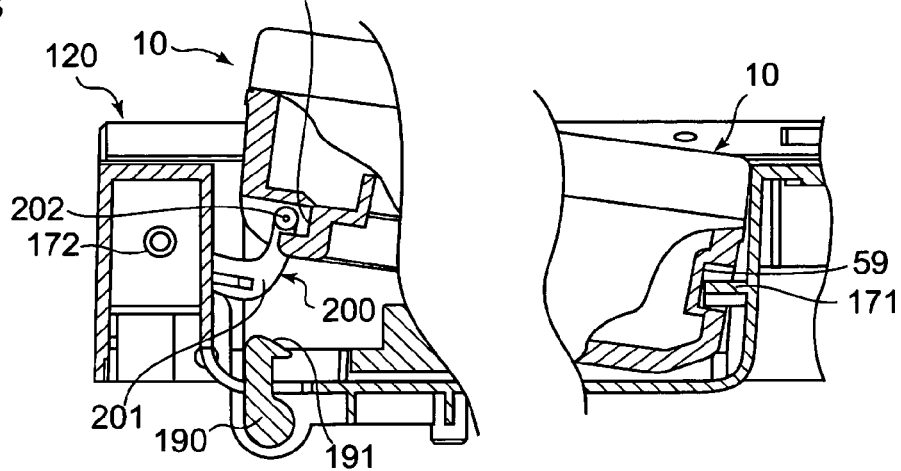
Figure 14C:
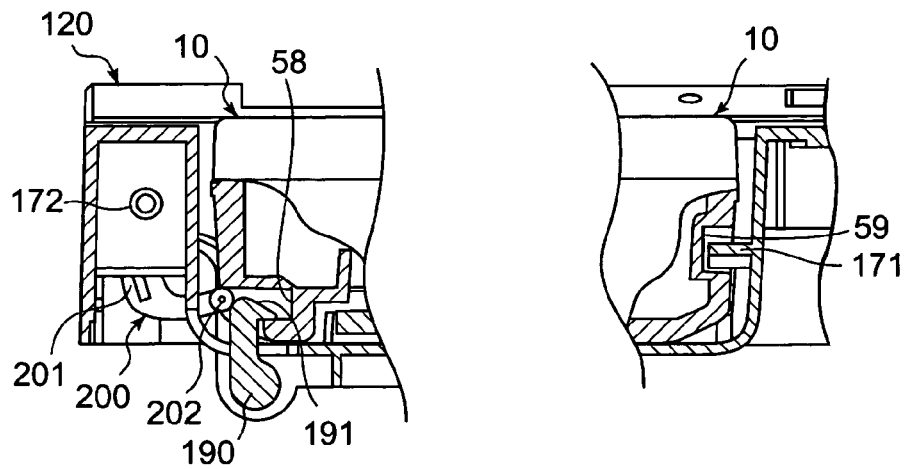

FIG. 14A through FIG. 14C are cutaway cross-sectional views illustrative of the method of attaching or detaching the portable apparatus 10 and the in-vehicle apparatus 100.

In order to attach the portable apparatus 10 to the in-vehicle apparatus 100, as shown in FIG. 14A, the side portion where the recess portion 59 is defined firstly needs to be inserted into the housing portion 170 with the portable apparatus 10 tilting toward the housing portion 170, so that the projection portion 171 defined at the side portion of the housing portion 170 may be engaged with the recess portion 59 defined at the side portion of the portable apparatus 10.

Herein, the recess portion 59 and the projection portion 171 are so formed to have a given margin respectively in size thereof, even when the recess portion 59 is obliquely inserted into the projection portion 171.

Subsequently, an opposite side to the side where the recess portion 59 is defined (the side where the latch portion 58 is defined) is pushed with the projection portion 171 and the recess portion 59 engaged with each other. Then, the arm portion 201 passes through a cutaway portion 58a, and the latch portion 58 and the push-out member 200 are in contact with each other, as shown in FIG. 14B. If a user releases his/her hands from the portable apparatus 10 in this state, the weight of the portable apparatus 10 causes the portable apparatus 10 to move downward slightly (in a depth direction of the drawing), so the engagement pin 202 of the push-out member 200 is engaged with a inner face of the latch portion 58.

The push-out member 200 is biased by the torsion spring 203 in a counterclockwise direction in FIG. 12.

When the portable apparatus 10 is further pushed, the push-out member 200 is turned by the portable apparatus 10 (the latch portion 58) in an opposite direction to the biasing direction of the torsion spring 203. As shown in FIG. 14C, the latch portion 58 and the lock mechanism 190 are engaged and the portable apparatus 10 is attached to the housing portion 170. The lock mechanism 190 is biased by the torsion spring 193 in a clockwise direction in FIG. 14. Also, the lock mechanism 190 is provided with the engagement nail 191 protruding toward an external radial direction from the central axis thereof.

Accordingly, when the latch portion 58 and the lock mechanism 190 are engaged, the latch portion 58 pushes the engagement nail 191 in a counterclockwise direction, and then the lock mechanism 190 turns in a clockwise direction due to the biasing force and the engagement nail 191 is engaged with an inner face of the latch portion 58. In this manner, the portable apparatus 10 is fixed to the housing portion 170 by the lock mechanism 190.

As stated heretofore, the portable apparatus 10 is attached to the housing portion 170, by turning the side where the latch portion 58 is formed, centering on the side where the recess portion 59 and the projection portion 171 are provided. That is to say, the portable apparatus 10 centers on the virtual axis line A indicated by a dotted line in FIG. 11.

The reason why one side of the portable apparatus 10 is centered on is this manner is to facilitate the attachment of the portable apparatus 10 into the housing portion 170. That is to say, when a user firstly inserts the side portion (where the recess portion 59 is defined) of the portable apparatus 10 into the housing portion 170, the recess portion 59 is engaged with the projection portion 171 and the portable apparatus 10 is positioned in the housing portion 170. By inserting the side, in which the latch portion 58 is defined, of the portable apparatus 10 in the afore-mentioned state, a user is able to attach the portable apparatus 10 into the housing portion 170 without touching the display portion 11 of the portable apparatus 10.

Next, a description will be given of the detachment of the portable apparatus 10 from the housing portion 170.

In order to detach the portable apparatus 10 from the housing portion 170, the detach button 160 is pushed. Then, the push portion 161 pushes the pushed portion 192, the lock mechanism 190 turns in a counterclockwise direction, and the latch portion 58 and the lock mechanism 190 are disengaged. By this, the push-out member 200 biases the portable apparatus 10 from the rear face to the front face of the portable apparatus 10, and the side in which the latch portion 58 is defined in the portable apparatus 10 is ejected from the housing portion 170. Hence, the push-out member 200 has a function of ejecting the portable apparatus 10 attached in the housing portion 170 from the housing portion 170.

Also, the arm portion 201 comes into contact with the cutaway portion 174, and then the push-out member 200 stops at a position shown in FIG. 14B. Additionally, at this time, by slightly moving the portable apparatus 10 downward (in a depth direction of FIG. 14B) according to the weight of the portable apparatus 10, the engagement pin 202 and the latch portion 58 are detachably engaged with each other. Therefore, the portable apparatus 10 maintains the state shown in FIG. 14B. A user is able to remove the portable apparatus 10 in the afore-mentioned state. Herein, the recess portion 59 and the projection portion 171 are also detachably engaged with each other with a given margin.

As stated heretofore, when the portable apparatus 10 is removed, the portable apparatus 10 centers on the side where the recess portion 59 is defined, namely, centers on the virtual axis line A indicated by a dotted line in FIG. 11.

The reason why the portable apparatus 10 is removed while centering on one side of the portable apparatus 10 is to prevent the portable apparatus 10 from dropping off from the housing portion 170. In other words, by detachably engaging the recess portion 59 and the projection portion 171, and the latch portion 58 and the engagement pin 202 respectively, as shown in FIG. 14B, the portable apparatus 10 is supported with the side in which the recess portion 59 is defined (hereinafter, referred to as one side) in the portable apparatus 10 housed in the housing portion 170 and with the side in which the latch portion 58 is defined (hereinafter, referred to as the other side) ejected, whereby the portable apparatus 10 can be prevented from dropping off from the housing portion 170.

In addition, the projection portion 171 has a function of guiding the portable apparatus 10 to revolve the other side of the portable apparatus 10 centering on one side thereof, when the portable apparatus 10 is attached or detached to and from the housing portion 170.

Furthermore, the projection portion 171 and the engagement pin 202 respectively have a function of detachably supporting the portable apparatus 10 with the portable apparatus 10 ejected from the housing portion 170. This facilitates the removal of the portable apparatus 10 from the in-vehicle apparatus 100.

Furthermore, the engagement pin 202 is integrally formed with the push-out member 200, thereby reducing the number of parts.

Also, as shown in FIG. 14B, when the portable apparatus 10 is supported with the other side of the portable apparatus 10 ejected from the housing portion 170, the engagement pin 202 maintains the engagement state with the latch portion 58 by the weight of the portable apparatus 10. Therefore, by moving the portable apparatus 10 slightly upward (in a front direction of FIG. 14B) and removing the portable apparatus 10 against the weight of the portable apparatus 10, the engagement state with the engagement pin 202 is easily disengaged and the portable apparatus 10 can be removed with ease.

In addition, at this time, the projection portion 171 and the engagement pin 202 support the portable apparatus 10 together, thereby enabling a stable support.

Also, the projection portion 171 is so formed to extend along one side of the portable apparatus 10 and guide the portable apparatus 10 to revolve. This makes it possible to guide the portable apparatus 10 to revolve with ease.

Furthermore, the housing portion 170 is defined in a recess shape, the projection portion 171 is formed in a protruding shape at an inner side of the housing portion 170, and the recess portion 59 in the portable apparatus 10 is defined in a recess shape. This can suppress the degradation in ease of grasp or appearance of the portable apparatus.

Next, the connector 150 will be described in detail.

The connector 150 and the connector 30 are fitted to each other and electrically connected, when the portable apparatus 10 is attached to the housing portion 170, and the connector 150 and the connector 30 release the fitting state, when the portable apparatus 10 is detached from the housing portion 170. Also, the connector 150 is a female connector and the connector 30 is a male connector.

Also, as shown in FIG. 11, the connector 150 is formed in the housing portion 170, and the connector 30 is formed at the corresponding position at the rear face of the portable apparatus 10, as shown in FIG. 8.

As described above, when the portable apparatus 10 is attached or detached to or from the housing portion 170, the portable apparatus 10 centers on the virtual axis line A indicated by a dotted line in FIG. 11. The connector 150 is formed to extend a longitudinal direction thereof along (in parallel with) the virtual axis line A at a position separate from the virtual axis line A. In other words, the connector 150 is provided closer to the other side of the portable apparatus 10 than to one side thereof attached in the housing portion 170.

Since the connector 150 is provided closer to the other side of the portable apparatus 10 than to one side thereof, the connector 150 and the connector 30 are easily fitted and released in accordance with the attachment or detachment of the portable apparatus 10 to or from the housing portion 170, as compared to a case where the connector 150 is provided closer to one side than to the other side. This is because the fitted and released directions of the connector 150 and the connector 30 are straighter and the move amount of the one side of the portable apparatus 10 is greater than that of the other side thereof. Accordingly, the attachment and the detachment of the portable apparatus 10 to and from the housing portion 170 are facilitated.

Such facilitated attachment and detachment further facilitate the fitting and release of the connector 150 and the connector 30, thereby reducing unnecessary load to the connector 150 and the connector 30.

Also, the connector 150 is formed in a rectangular shape, and the longitudinal direction thereof is disposed to extend along (in parallel with) the virtual axis line A. With this configuration, it is possible to suppress angles of fitting and release of the connector 150 and the connector 30 to be changed depending on the positions (connection terminals) of the connector 150 and the connector 30, and it is also possible to suppress the change in the move amount in fitting and release depending on the position (connection terminal) of the connector 30. This ensures and facilitates the fitting and release of the connector 150 and the connector 30.

That is, when the longitudinal direction of the connector 150 is placed perpendicularly to the direction of the virtual axis line A, the move amount of the connection terminal is greater at the other side of the connector 30 and that of the connection terminal is smaller at one side thereof. The connection terminals at the other side are sequentially released. In the state shown in FIG. 14B, all the connection terminals are not released. However, if the longitudinal direction of the connector 150 is placed along (in parallel with) the direction of the virtual axis line A, all the connection terminals are released at the same time. Therefore, in the state shown in FIG. 14B, all the connection terminals will be released.

Also, the connector 150 is formed in the proximity of the push-out member 200. Accordingly, when the portable apparatus 10 attached is ejected from the housing portion 170, the push-out member 200 pushes the proximity of the connector 30.

With this configuration, the engagement of the connector 150 and the connector 30 can be released with power as small as possible.

Next, a description will be given of a position where the detach button 160 is formed.

The detach button 160, as shown in FIG. 11 and the like, is provided at the front face side of the front face portion 120, and the operating portion 132 and the housing portion 170 are provided at the front face side.

Also, the detach button 160 and the operating portion 132 are respectively provided at opposite sides interposing the housing portion 170. This can prevent the possibility of operating the detach button 160 mistakenly, while the operating portion 132 is being operated.

Since the operating portion 132 is located at the driver's side and the detach button 160 is located at the front-passenger's side, it is possible to prevent the possibility of operating the detach button 160 mistakenly, while a driver is steering or shifting.

As described above, the portable apparatus 10 housed in the housing portion 170 is ejected from the housing portion 170 at the other side of the portable apparatus 10, by operating the detach button 160. Also, the detach button 160 is provided closer to the other side of the portable apparatus 10 than to one side thereof. For this reason, immediately after the detach button 160 is operated, the other side of the portable apparatus 10 is ejected, thereby enabling the portable apparatus 10 to be removed by a successive operation after the detach button 160 is operated.

In addition, the detach button 160 is provided at an upper portion of the front face side of the front face portion 120. With this configuration, a passenger sitting on the front-passenger's seat or a driver is easily able to operate the detach button 160. Therefore, it is possible to remove the portable apparatus 10 easily.

In the present exemplary embodiment, when the portable apparatus 10 is attached or detached to or from the housing portion 170, the portable apparatus 10 is guided to revolve with one side as an axis. However, the present invention is not limited thereto. Another example is that the portable apparatus 10 may be attached in parallel with the housing portion 170, when attached, and the portable apparatus 10 may guided to revolve with one side as an axis, when detached.

Furthermore, in the present exemplary embodiment, the in-vehicle system 1 composed of the in-vehicle apparatus 100 and the portable apparatus 10 has been described; however, the present invention is not limited to the in-vehicle apparatus.

Furthermore, the portable apparatus 10 may be composed of a mobile telephone with the navigation functionality or a personal digital assistance (PDA). For example, if it is difficult to electrically connect a mobile telephone with the navigation functionality and an electronic apparatus, the electrical connection may be established by wireless communication (an example is Bluetooth) and the mobile telephone is housed in the electronic apparatus as a mechanical structure.

Furthermore, instead of the CD insertion/ejection slot 180 and the CD player 135, there may be provided an insertion/ejection slot and a player thereof for another memory media such as MD (Mini Disk), DVD (Digital Versatile Disk), SD memory card, or the like, and there may also provided insertion/ejection slots and players for multiple types of memory media.

Although a few specific exemplary embodiments employed in the present invention have been shown and described, it would be appreciated by those skilled in the art that changes may be made in these exemplary embodiments without departing from the principles and spirit of the invention, the scope of which is defined in the claims and their equivalents.

What is claimed is:

1. An electronic apparatus detachably holding a portable apparatus, the electronic apparatus comprising:
    a housing portion to which the portable apparatus is attached;
    an eject mechanism ejecting the portable apparatus attached to the housing portion;
    a support mechanism detachably supporting the portable apparatus in an ejected state where the portable apparatus is ejected from the housing portion;
    a removal operating portion for detaching the portable apparatus;
    a lock mechanism configured to lock the portable apparatus and configured to be operated by the removal operating portion, wherein the lock mechanism and the eject mechanism are independently provided; and
    a main body and a front face portion capable of tilting with respect to the main body, wherein the housing portion, the eject mechanism, the support mechanism, the removal operating portion, and the lock mechanism are provided in the front face portion.

2. The electronic apparatus as claimed in claim 1, wherein a portion of the portable apparatus is housed and another portion thereof is ejected in the ejected state.

3. The electronic apparatus as claimed in claim 1, wherein:
    the eject mechanism includes a pushing member pushing the portable apparatus from the housing portion;
    the support mechanism has a first engagement portion detachably engaged with the portable apparatus in the ejected state; and
    the first engagement portion is integrally formed with the pushing member.

4. The electronic apparatus as claimed in claim 3, wherein a weight of the portable apparatus maintains an engagement state with the portable apparatus in the first engagement portion.

5. The electronic apparatus as claimed in claim 1, wherein the support mechanism guides the portable apparatus to set one side of the portable apparatus as an axis and to cause another side opposing the one side to revolve, when the portable apparatus is ejected from the housing portion, and has a second engagement portion to be detachably engaged with the portable apparatus in the ejected state.

6. The electronic apparatus as claimed in claim 5, wherein the second engagement portion is formed to extend along the one side of the portable apparatus, when attached.

7. The electronic apparatus as claimed in claim 5, wherein the second engagement portion is formed as a projection at an inner side of the housing portion to be engaged with a recess portion defined in the portable apparatus.

8. The electronic apparatus as claimed in claim 1, wherein the support mechanism comprises:
    a first engagement portion to be detachably engaged with the portable apparatus in the ejected state;
    a second engagement portion guiding the portable apparatus to set one side of the portable apparatus as an axis and to cause another side opposing the one side to revolve, when the portable apparatus is ejected from the housing portion and being detachably engaged with the portable apparatus in the ejected state; and
    the first and second engagement portions removably support the portable apparatus in the ejected state in conjunction with each other.

9. An electronic system provided with an electronic apparatus having a housing portion in which a portable apparatus and the electronic apparatus are detachably held, the electronic apparatus comprising:
    a housing portion to which the portable apparatus is attached;
    an eject mechanism ejecting the portable apparatus attached to the housing portion;

a support mechanism detachably supporting the portable apparatus in an ejected state where the portable apparatus is ejected from the housing portion;

a removal operating portion for detaching the portable apparatus;

a lock mechanism configured to lock the portable apparatus and configured to be operated by the removal operating portion, wherein the lock mechanism and the eject mechanism are independently provided; and a main body and a front face portion capable of tilting with respect to the main body, wherein the housing portion, the eject mechanism, the support mechanism, the removal operating portion, and the lock mechanism are provided in the front face portion.

10. The electronic system as claimed in claim 9, wherein the portable apparatus is a navigation apparatus.

* * * * *